United States Patent
Peters et al.

(10) Patent No.: US 9,612,174 B2
(45) Date of Patent: Apr. 4, 2017

(54) METHOD AND SYSTEMS FOR EXHAUST GAS RECIRCULATION VALVE DIAGNOSIS BASED ON CRANKCASE PRESSURE

(71) Applicant: General Electric Company, Schenectady, NY (US)

(72) Inventors: Eric David Peters, Cocoa, FL (US); Nicholas Eric Hansen, Erie, PA (US)

(73) Assignee: General Electric Corporation, Schenectady, NY (US)

(*) Notice: Subject to any disclaimer, the term of this patent is extended or adjusted under 35 U.S.C. 154(b) by 79 days.

(21) Appl. No.: 14/540,548

(22) Filed: Nov. 13, 2014

(65) Prior Publication Data

US 2016/0138526 A1  May 19, 2016

(51) Int. Cl.

| | |
|---|---|
| G01L 11/04 | (2006.01) |
| F02D 41/22 | (2006.01) |
| G01M 15/08 | (2006.01) |
| F02M 26/49 | (2016.01) |
| F02M 26/52 | (2016.01) |
| F02D 41/00 | (2006.01) |
| F02M 25/06 | (2016.01) |
| F02M 26/10 | (2016.01) |
| F02M 26/43 | (2016.01) |
| F01M 13/00 | (2006.01) |
| F02M 26/08 | (2016.01) |
| F02M 26/23 | (2016.01) |

(52) U.S. Cl.
CPC .......... *G01L 11/04* (2013.01); *F02D 41/0077* (2013.01); *F02D 41/22* (2013.01); *F02D 41/221* (2013.01); *F02M 25/06* (2013.01); *F02M 26/10* (2016.02); *F02M 26/43* (2016.02); *F02M 26/49* (2016.02); *F02M 26/52* (2016.02); *G01M 15/08* (2013.01); *F01M 2013/0083* (2013.01); *F02M 26/08* (2016.02); *F02M 26/23* (2016.02)

(58) Field of Classification Search
CPC ........ G01L 11/04; F02M 26/43; F02M 26/10; F02M 25/06; F02M 26/49; F02M 26/52; F02D 41/0077; F02D 41/221; F02D 41/22; G01M 15/08
USPC ........................................................ 60/605.2
See application file for complete search history.

(56) References Cited

U.S. PATENT DOCUMENTS 4,424,709 A * 1/1984 Meier, Jr. ............. G01M 15/09
                                                    701/102
5,094,206 A   3/1992 Buslepp et al.
6,434,476 B1  8/2002 Zagone
(Continued)

FOREIGN PATENT DOCUMENTS

RU         2490495 C2    8/2013

OTHER PUBLICATIONS

Eurasian Search Report issued in connection with corresponding EA Application No. 201591991 on Apr. 7, 2016.

*Primary Examiner* — Nicholas J Weiss
*Assistant Examiner* — Jason T Newton
(74) *Attorney, Agent, or Firm* — John A. Kramer; Global Patent Operation

(57) ABSTRACT

Various methods and systems are provided for diagnosing an exhaust gas recirculation valve based on crankcase pressure. In one example, a method comprises indicating a condition of a valve disposed in a first exhaust passage downstream from a cylinder exhaust valve based at least in part on a crankcase pressure.

10 Claims, 9 Drawing Sheets

(56) References Cited

U.S. PATENT DOCUMENTS

| | | | |
|---|---|---|---|
| 2011/0023852 A1* | 2/2011 | Yamashita | F01M 13/00 |
| | | | 123/574 |
| 2012/0059572 A1 | 3/2012 | Larsson et al. | |
| 2012/0265396 A1 | 10/2012 | Makki et al. | |
| 2013/0073174 A1* | 3/2013 | Worden | F02D 41/22 |
| | | | 701/102 |
| 2013/0186376 A1 | 7/2013 | Peters et al. | |
| 2014/0014080 A1 | 1/2014 | Beshay et al. | |
| 2014/0067228 A1* | 3/2014 | Polkus | F02B 37/007 |
| | | | 701/102 |
| 2014/0081564 A1* | 3/2014 | Pursifull | F02M 35/10222 |
| | | | 701/113 |

* cited by examiner

METHOD AND SYSTEMS FOR EXHAUST GAS RECIRCULATION VALVE DIAGNOSIS BASED ON CRANKCASE PRESSURE

BACKGROUND

Technical Field

Embodiments of the subject matter disclosed herein relate to engines. Other embodiments relate to engine diagnostics.

Discussion of Art

Engines may utilize recirculation of exhaust gas from an engine exhaust system to an engine intake system, a process referred to as exhaust gas recirculation (EGR), to reduce regulated emissions. Some EGR systems may include one or more valves to direct exhaust to an intake passage and/or an exhaust passage of the engine based on a desired amount of EGR. Under some conditions, the one or more valves may become stuck in undesired positions, or may be inadvertently mis-positioned. Further still, degradation of one or more of these valves may result in degradation in engine performance and/or eventual engine shutdown.

BRIEF DESCRIPTION

In one embodiment, a method for an engine (e.g., a method for controlling an engine system) comprises indicating a condition of a valve disposed in an exhaust passage downstream from a cylinder exhaust valve based at least in part on a crankcase pressure.

DETAILED DESCRIPTION

The following description relates to embodiments of methods and systems for indicating a condition of a valve disposed in a first exhaust passage downstream from a cylinder exhaust valve based at least in part on a crankcase pressure. In one example, the valve is one of a first valve and a second valve of an exhaust gas recirculation (EGR) system of an engine. The EGR system may selectively route exhaust from the engine to a second exhaust passage via the first valve and to an intake passage via the second valve. In one example, indicating the condition of the first valve and/or the second valve may include indicating one or more of mis-positioning, degradation, sticking, or leaking of one or more of the first valve and the second valve. As a result, engine servicing and/or valve checking routines may be targeted based on the condition of the two valves.

Figure 1:
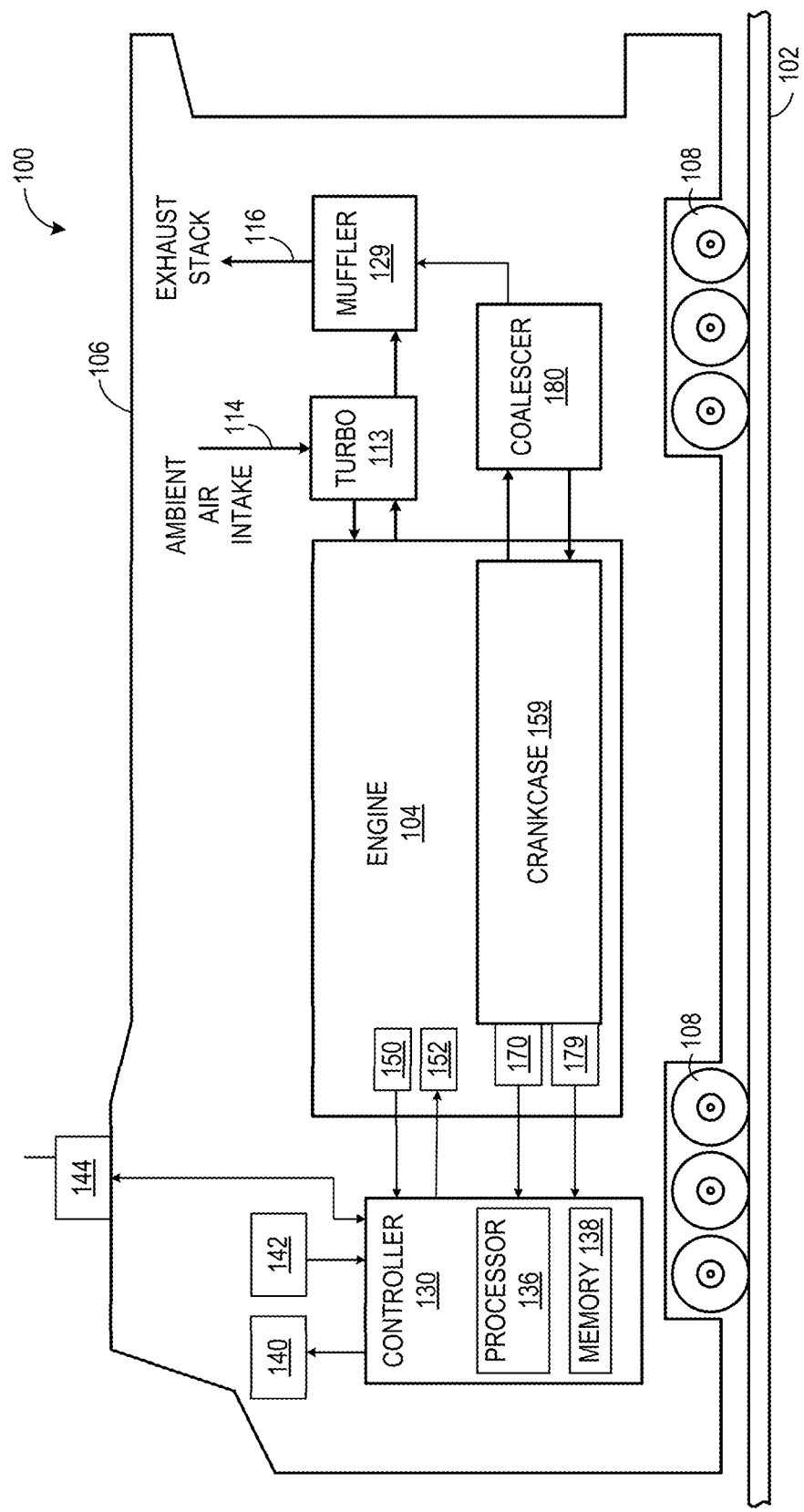
FIG. 1 shows a schematic diagram of a vehicle including an engine having a crankcase according to an embodiment of the invention.
Figure 2:
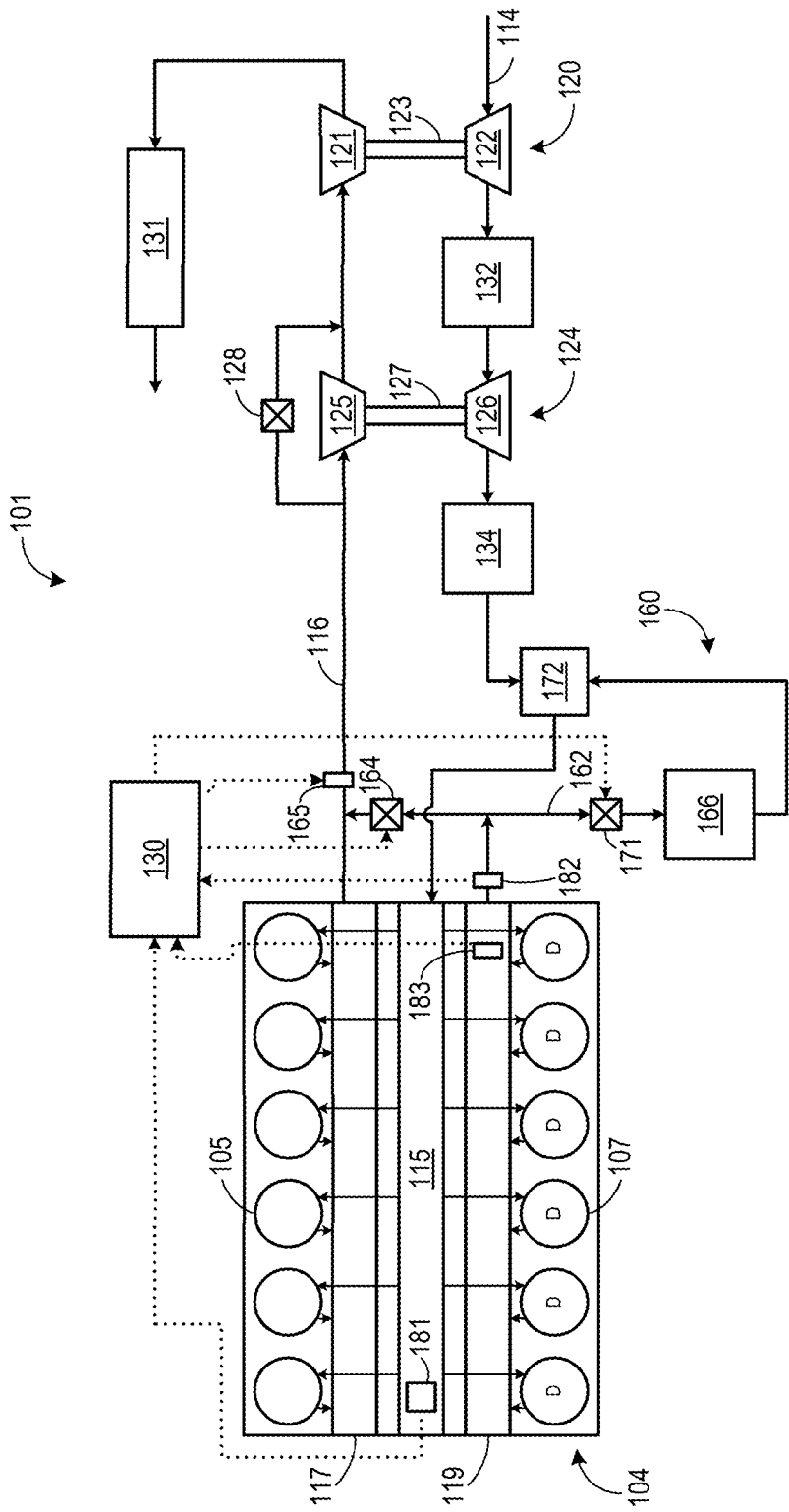
FIG. 2 shows a schematic diagram of an engine with an exhaust gas recirculation system according to an embodiment of the invention.
Figure 7:
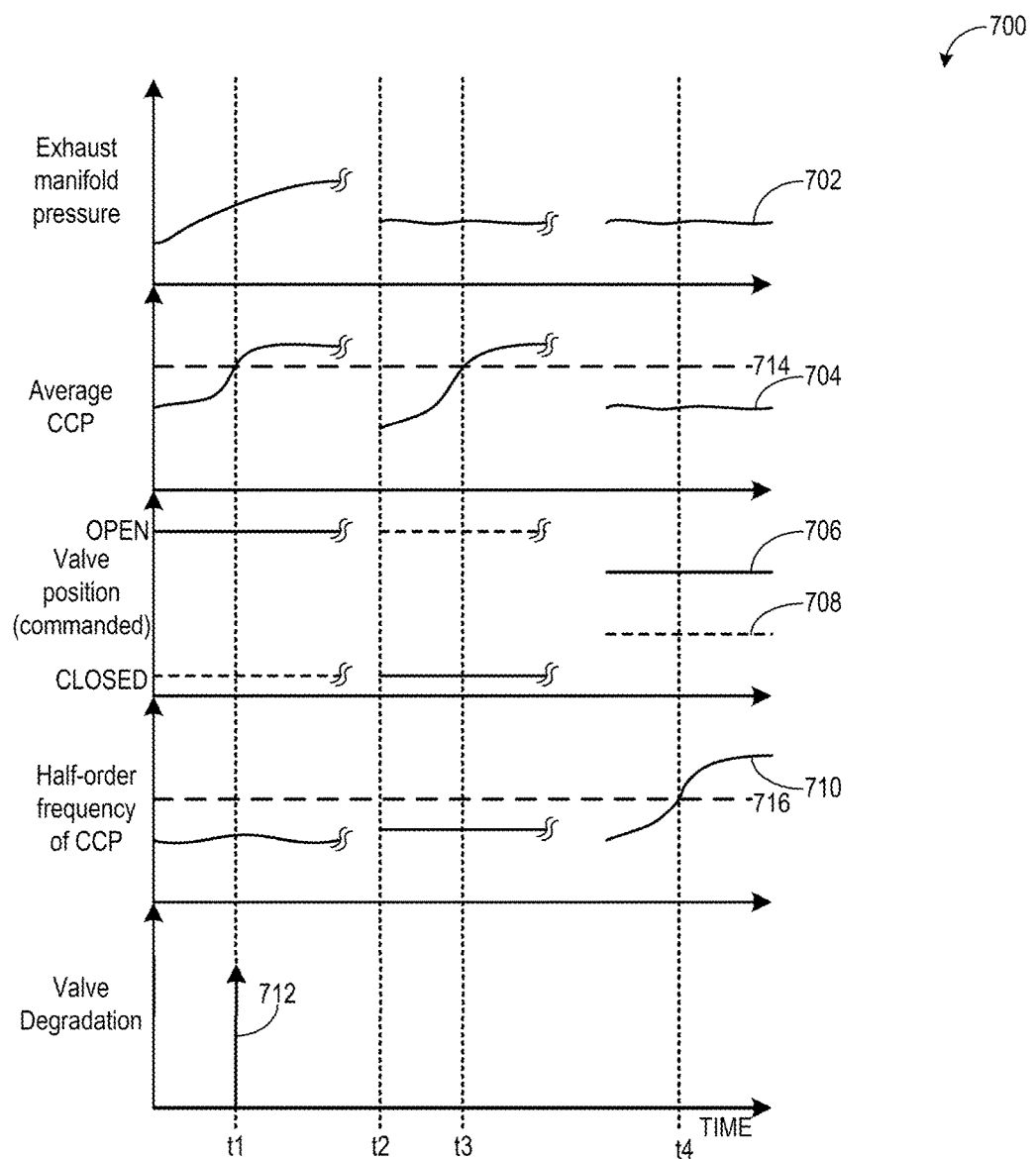
FIG. 7 shows a graph illustrating changes in exhaust pressure and crankcase pressure due to a condition of different engine system components according to an embodiment of the invention.
Figure 8:
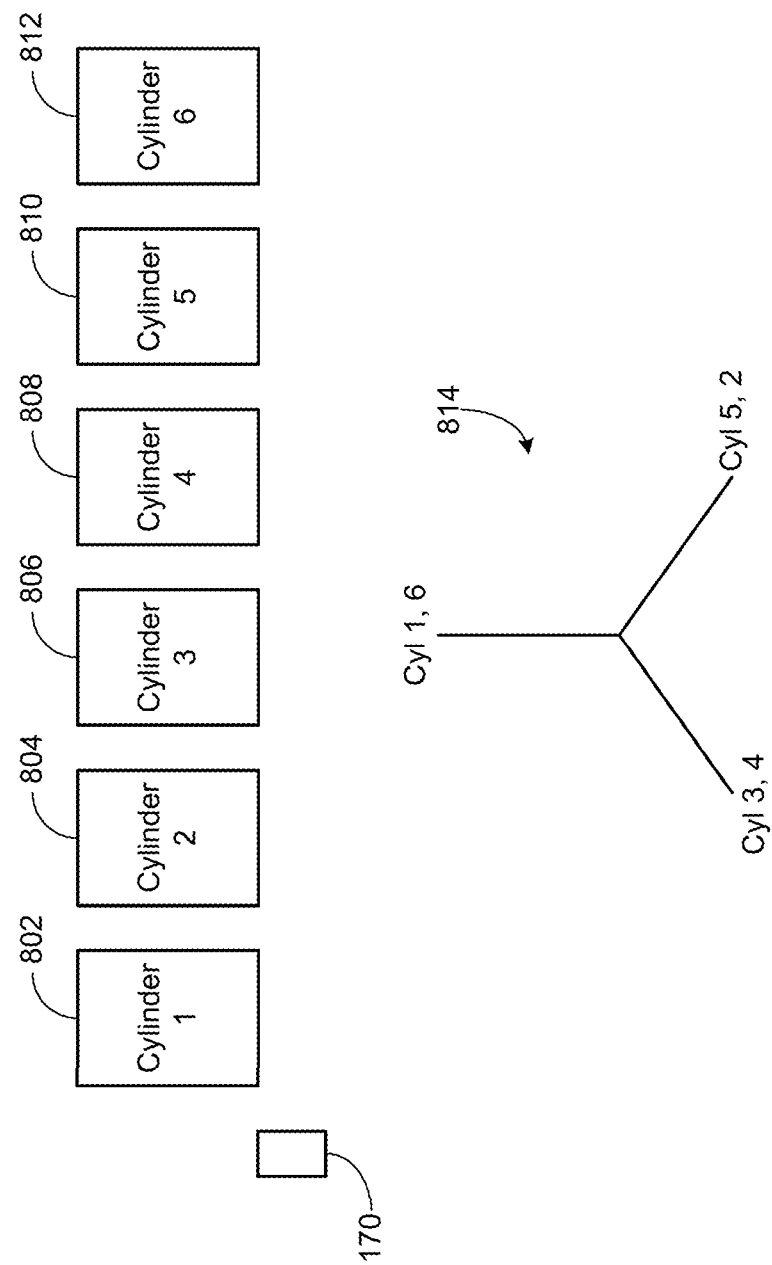
FIG. 8 shows an example cylinder configuration relative to a crankcase pressure sensor in an engine according to an embodiment of the invention.
Figure 9:
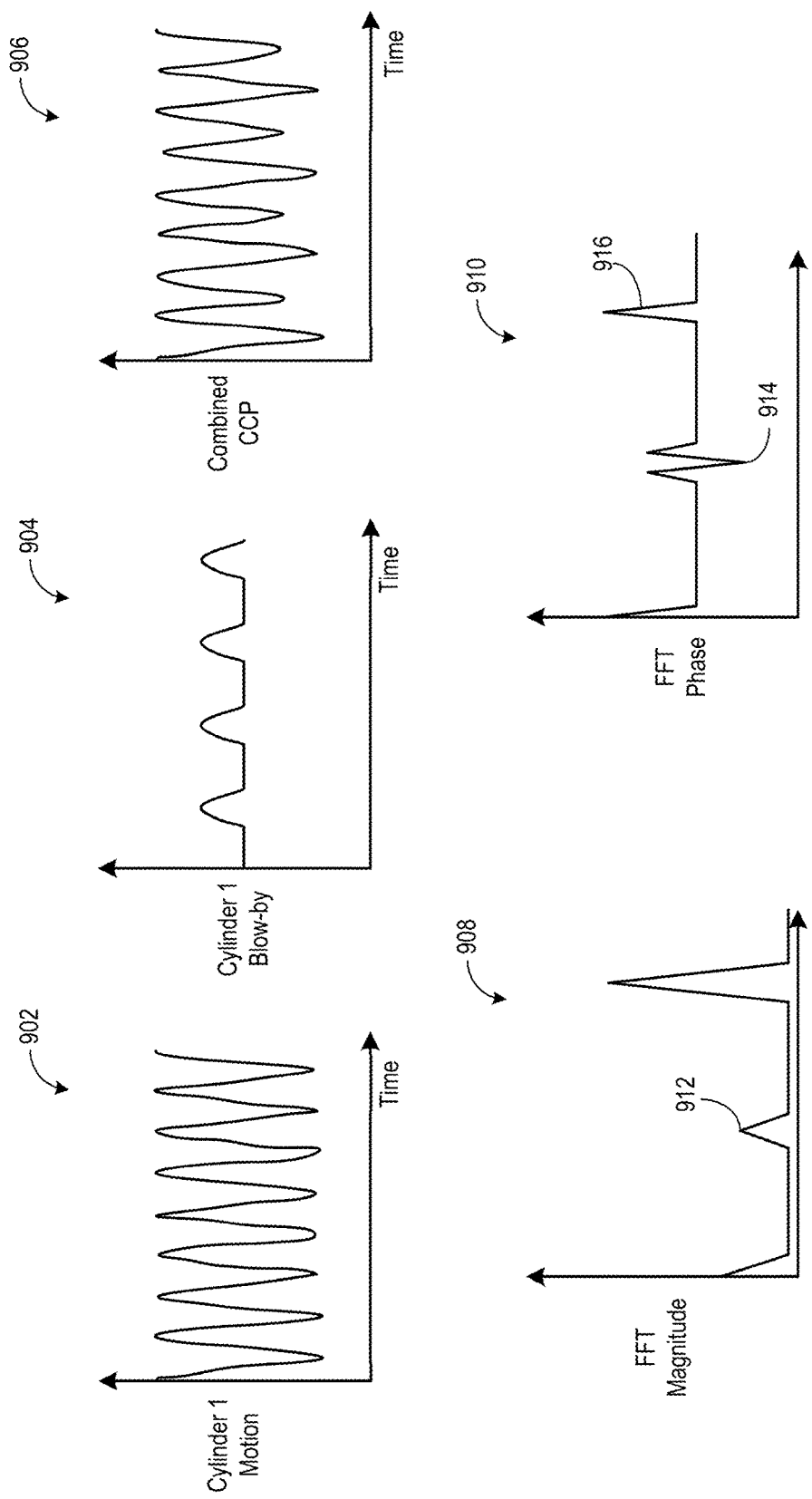
FIGS. 9-10 show example crankcase pressure time domain and frequency domain data for different degraded cylinders in an engine firing order according to an embodiment of the invention.
Figure 10:
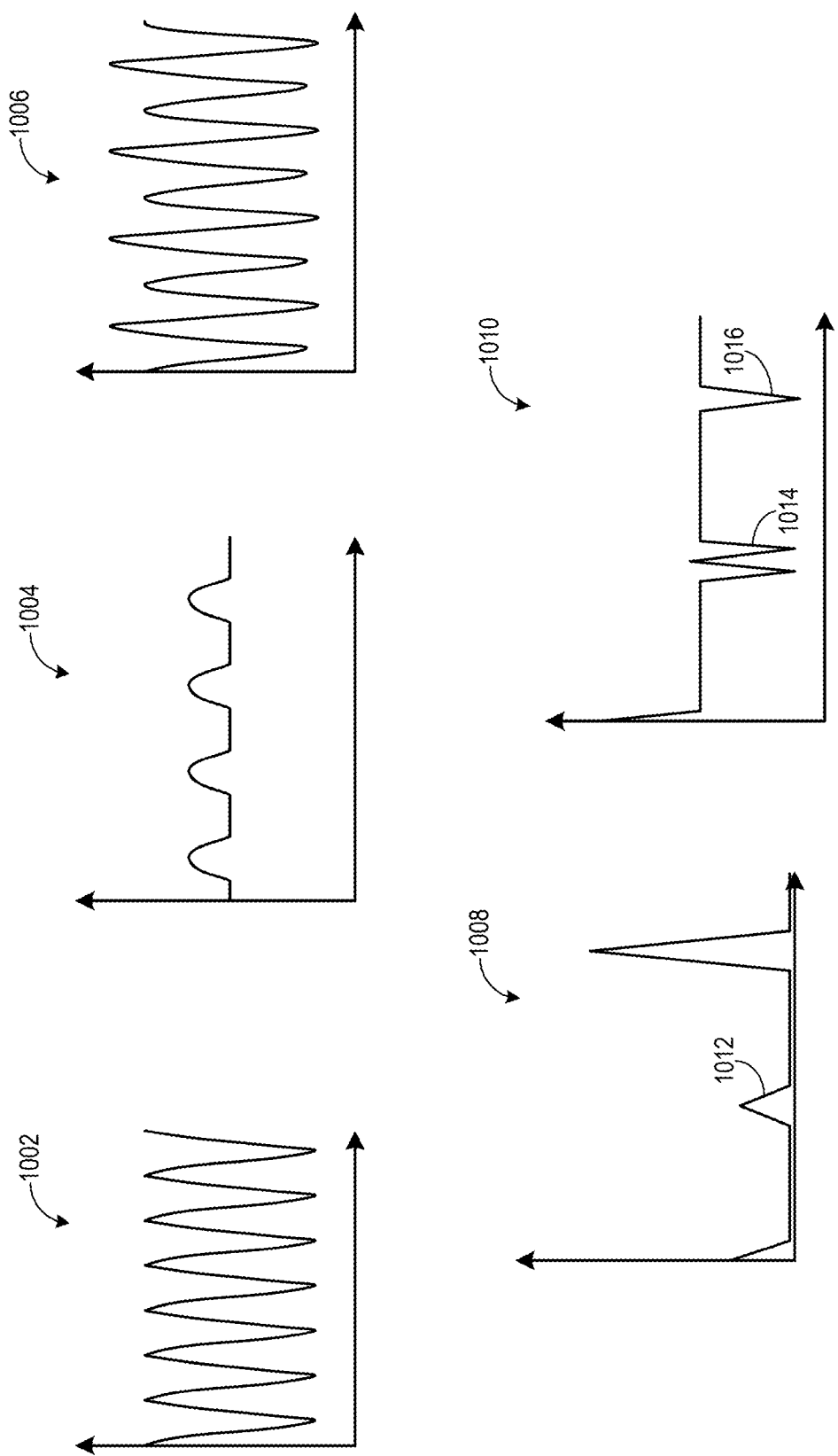

FIG. 1 shows an embodiment of a vehicle including an engine having a crankcase. FIG. 2 shows an embodiment of an engine, such as the engine of FIG. 1, including an EGR system including a first valve, second valve, and EGR cooler. The first valve controls a flow of exhaust from the engine to an exhaust passage while the second valve controls a flow of exhaust from the engine to the EGR cooler and intake passage. An engine controller may adjust a position of the first and second valve based on engine operating conditions, as shown in a method presented at FIG. 3. During operation, one or more of the first and second valves may become degraded or stuck in a closed position. In another example, the EGR cooler may become degraded or restricted. As a result, engine performance may become degraded due to changing exhaust pressures. As shown at FIG. 4, the engine controller may detect EGR component degradation based on a crankcase pressure and a pressure of an exhaust manifold of the engine. Additionally, degradation of the EGR valves vs. degradation of an engine cylinder vs. degradation of an additional engine system component (such as a turbocharger or evacuation system of the crankcase) may be differentiated between based on the crankcase pressure and the exhaust manifold pressure. Graphical examples of crankcase pressure data for identifying which cylinder in an engine is degraded after indicating cylinder degradation is shown at FIGS. 8-10. Additionally, FIG. 7 illustrates the changing exhaust manifold pressure and crankcase pressure due to degradation of different engine system components.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a mobile platform supporting a system incorporating an embodiment of the invention.

Before further discussion of the approach for indicating a condition of an EGR valve based on a crankcase pressure, FIG. 1 presents a block diagram of an example embodiment of a vehicle system 100 (e.g., a locomotive system), herein depicted as a rail vehicle 106 configured to run on a rail 102 via a plurality of wheels 108. As depicted, the rail vehicle 106 includes an engine system 101 with an engine 104.

The engine receives intake air for combustion from an intake passage 114. The intake passage receives ambient air from outside of the rail vehicle. Exhaust gas resulting from combustion in the engine is supplied to an exhaust passage 116. Exhaust gas flows through the exhaust passage, and out of an exhaust stack of the rail vehicle.

The engine system includes a turbocharger 113 (TURBO) that is arranged between the intake passage and the exhaust passage. The turbocharger increases air charge of ambient air drawn into the intake passage in order to provide greater charge density during combustion to increase power output and/or engine-operating efficiency. In one embodiment, turbocharger may include a compressor (not shown) which is at least partially driven by a turbine (not shown). The turbocharger may include multiple turbine and/or compressor stages. For example, as shown in FIG. 2, the engine may include multiple turbochargers.

The engine includes a crankcase 159. The crankcase is an enclosure for a crankshaft connected to cylinders (not shown in FIG. 1) of the engine. The crankshaft may be lubricated by engine oil that is pumped by an oil pump (not shown) and sprayed onto the crankshaft. The crankcase may include an evacuation system. For example, unburned fuel, air, and exhaust gasses may escape past the cylinders and into the crankcase. The unburned fuel, air, and exhaust gasses, as well as engine oil, may be vented from the evacuation system of crankcase and routed to a coalescer 180. The coalescer may be configured to separate engine oil from the unburned fuel, air, and exhaust gasses and to return the engine oil to the crankcase. The unburned fuel, air, and exhaust gasses may be routed from the coalescer to a muffler 129 arranged between the turbocharger turbine and the exhaust passage. The muffler may be configured to dampen exhaust noise. In one embodiment, the muffler may include an eductor (not shown). The eductor may create suction from the crankcase through the coalescer and into the muffler. For example, the eductor may use the Venturi effect to create suction as exhaust gasses flow through the muffler. In another example, the vehicle system may not include a muffler and instead unburned fuel, air, and exhaust gases from the coalescer may be routed directly to the exhaust passage or an alternate component within the exhaust passage.

In some embodiments, the vehicle system may further include an exhaust gas treatment system (such as the exhaust gas treatment system 131 shown in FIG. 2) coupled in the exhaust passage upstream or downstream of the turbocharger 120.

The rail vehicle further includes a controller 130 (e.g., may also be referred to as a control system) to control various components related to the vehicle system. In one example, controller includes a computer control system. In one embodiment, the computer control system includes a processor, such as processor 136. The controller may include multiple engine control units (ECU) and the control system may be distributed among each of the ECUs. The controller further includes computer readable storage media, such as memory 138, including instructions for enabling on-board monitoring and control of rail vehicle operation. The memory may include volatile and non-volatile memory storage.

The controller may oversee control and management of the vehicle system. The controller may receive signals from a variety of engine sensors 150 to determine operating parameters and operating conditions, and correspondingly adjust various engine actuators 152 to control operation of the rail vehicle. For example, the controller may receive signals from various engine sensors including engine speed, engine load, boost pressure, exhaust pressure, ambient pressure, exhaust temperature, etc. As another example, the controller may receive a signal from a crankcase pressure sensor 170 that indicates a pressure of the crankcase. As another example, the controller may receive a signal from a crankshaft position sensor 179 that indicates a position of the crankshaft. Correspondingly, the controller may control the vehicle system by sending commands to various components such as traction motors, alternator, cylinder valves, throttle, etc. Signals from engine sensors may be bundled together into one or more wiring harnesses to reduce space in the vehicle system devoted to wiring and to protect the signal wires from abrasion and vibration.

The controller may include onboard electronic diagnostics for recording operational characteristics of the engine. Operational characteristics may include measurements from the engine sensors (including the crankcase pressure sensor and crankshaft position sensor), for example. In one embodiment, the operational characteristics may be stored in a database in the memory of the controller. In one embodiment, current operational characteristics may be compared to past operational characteristics to determine trends of engine performance.

The controller may include onboard electronic diagnostics for identifying and recording potential degradation and failures of components of vehicle system. For example, when a potentially degraded component (e.g., engine component) is identified, a diagnostic code may be stored in the memory of the controller. In one embodiment, a different diagnostic code may correspond to each type of degradation that may be identified by the controller. For example, a first diagnostic code may indicate piston ring wear of a first cylinder, a second diagnostic code may indicate piston ring wear of a second cylinder, a third diagnostic code may indicate potential degradation of the crankcase evacuation system, a fourth diagnostic code may indicate potential degradation of the turbocharger, a fifth diagnostic code may indicate potential degradation of an exhaust valve (such as an exhaust gas recirculation (EGR) valve), and the like.

The controller may be further linked to a display 140, such as a diagnostic interface display, providing a user interface to the locomotive operating crew and a maintenance crew. The controller may control the engine, in response to operator input via user input controls 142, by sending a command to correspondingly adjust various engine actuators. Non-limiting examples of user input controls may include a throttle control, a braking control, a keyboard, and a power switch. Further, operational characteristics of the engine, such as diagnostic codes corresponding to degraded components, may be reported via the display to the operator and/or the maintenance crew.

The vehicle system may include a communications system 144 linked to the controller. In one embodiment, the communications system may include a radio and an antenna for transmitting and receiving voice and data messages. For example, data communications may be between vehicle system and a control center of a railroad, another locomotive, a satellite, and/or a wayside device, such as a railroad switch. For example, the controller may estimate geographic coordinates of vehicle system using signals from a GPS receiver. As another example, the controller may transmit operational characteristics of the engine to the control center via a message transmitted from the communications system. In one embodiment, a message may be transmitted to and displayed in the command center by the communications system when a degraded component of the engine is detected and the vehicle system may be scheduled for maintenance.

FIG. 2 presents a block diagram of an exemplary embodiment of an engine system 101 with the engine 104, as described above with reference to FIG. 1. The engine receives intake air for combustion from an intake, such as an intake manifold 115. The intake may be any suitable conduit or conduits through which gases flow to enter the engine. For example, the intake may include the intake manifold, the intake passage 114, and the like. The intake passage may receive ambient air from an air filter (not shown) that filters air from outside of a vehicle in which the engine may be positioned (such as rail vehicle 106 shown in FIG. 1). Exhaust gas resulting from combustion in the engine is supplied to an exhaust, such the exhaust passage 116. The exhaust may be any suitable conduit through which gases flow from the engine. For example, the exhaust may include an exhaust manifold, the exhaust passage, and the like. Exhaust gas flows through the exhaust passage. In one embodiment, the exhaust passage includes a NOx and/or oxygen sensor for measuring a NOx and oxygen level of the exhaust gas.

In the example embodiment depicted in FIG. 2, the engine is a V-12 engine having twelve cylinders. In other examples, the engine may be a V-6, V-8, V-10, V-16, 1-4, 1-6, 1-8, opposed 4, or another engine type. As depicted, the engine includes a subset of non-donor cylinders 105, which includes six cylinders that supply exhaust gas exclusively to a non-donor cylinder exhaust manifold 117, and a subset of donor cylinders 107, which includes six cylinders that supply exhaust gas exclusively to a donor cylinder exhaust manifold 119. In other embodiments, the engine may include at least one donor cylinder and at least one non-donor cylinder. For example, the engine may have four donor cylinders and eight non-donor cylinders, or three donor cylinders and nine non-donor cylinders. It should be understood, the engine may have any desired numbers of donor cylinders and non-donor cylinders, with the number of donor cylinders typically lower than the number of non-donor cylinders. In another example, the engine may not include any donor cylinders and instead exhaust from all the engine cylinder may be routed to a common exhaust passage (for example, an EGR system as described further below may be coupled to at least a portion of the common exhaust passage).

As depicted in FIG. 2, the non-donor cylinders are coupled to the exhaust passage to route exhaust gas from the engine to atmosphere (after it passes through an exhaust gas treatment system 131 and first and second turbochargers 120 and 124). The donor cylinders, which provide engine exhaust gas recirculation (EGR), are coupled exclusively to an EGR passage 162 of an EGR system 160 which routes exhaust gas from the donor cylinders to the intake passage of the engine, and not to atmosphere. By introducing cooled exhaust gas to the engine, the amount of available oxygen for combustion is decreased, thereby reducing combustion flame temperatures and reducing the formation of nitrogen oxides (e.g., $NO_x$).

In the example embodiment shown in FIG. 2, when a second valve 171 is open, exhaust gas flowing from the donor cylinders to the intake passage passes through a heat exchanger such as an EGR cooler 166 to reduce a temperature of (e.g., cool) the exhaust gas before the exhaust gas returns to the intake passage. The EGR cooler may be an air-to-liquid heat exchanger, for example. In such an example, one or more charge air coolers 132 and 134 disposed in the intake passage (e.g., upstream of where the recirculated exhaust gas enters) may be adjusted to further increase cooling of the charge air such that a mixture temperature of charge air and exhaust gas is maintained at a desired temperature. In other examples, the EGR system may include an EGR cooler bypass. Alternatively, the EGR system may include an EGR cooler control element. The EGR cooler control element may be actuated such that the flow of exhaust gas through the EGR cooler is reduced; however, in such a configuration, exhaust gas that does not flow through the EGR cooler is directed to the exhaust passage rather than the intake passage.

Further, the EGR system includes a first valve 164 disposed between the exhaust passage and the EGR passage. The second valve may be an on/off valve controlled by the controller 130 (for turning the flow of EGR on or off), or it may control a variable amount of EGR, for example. In some examples, the first valve may be actuated such that an EGR amount is reduced (exhaust gas flows from the EGR passage to the exhaust passage). In other examples, the first valve may be actuated such that the EGR amount is increased (e.g., exhaust gas flows from the exhaust passage to the EGR passage). In some embodiments, the EGR system may include a plurality of EGR valves or other flow control elements to control the amount of EGR.

In such a configuration, the first valve is operable to route exhaust from the donor cylinders to the exhaust passage of the engine and the second valve is operable to route exhaust from the donor cylinders to the intake passage of the engine. In the example embodiment shown in FIG. 2, the first valve and the second valve may be engine oil, or hydraulically, actuated valves, for example, with a shuttle valve (not shown) to modulate the engine oil. In some examples, the valves may be actuated such that one of the first and second valves and is normally open and the other is normally closed. In other examples, the first and second valves and may be pneumatic valves, electric valves, or another suitable valve.

The engine system further includes a donor cylinder exhaust pressure sensor 183 disposed in the donor cylinder exhaust manifold upstream of the first valve and the second valve. In an alternate embodiment, the donor cylinder exhaust pressure sensor may be positioned in the exhaust gas recirculation system upstream of the first valve and the second valve. In engine systems not including donor cylinders, an exhaust pressure sensor may be positioned in an exhaust manifold (e.g., exhaust manifold pressure sensor) or exhaust passage upstream of the first valve and the second valve.

A temperature sensor 182 is disposed in the exhaust gas recirculation system upstream of the first valve and the second valve. As described below with reference to FIGS. 3 and 4, the first and second valves and may be adjusted based on temperature measured by the temperature sensor and/or pressure measured by the donor cylinder exhaust pressure sensor. In some embodiments, each of the engine cylinders may include a separate temperature sensor and/or pressure sensor such that there are a plurality of temperature sensors and/or pressure sensors. In other examples, the engine system may include a plurality of temperatures sensors disposed downstream of the exhaust valve of each of the engine cylinders and only one pressure sensor, or vice versa. Further, in one example, degradation of the first valve and the second valve may be at least partially based on the donor cylinder exhaust pressure (e.g., donor cylinder exhaust manifold pressure) measured by the donor cylinder exhaust pressure sensor. In another example, degradation of the first valve and the second valve may be at least partially based on the exhaust pressure measured upstream of the first valve and the second valve.

As shown in FIG. 2, the engine system further includes an EGR mixer 172 which mixes the recirculated exhaust gas with charge air such that the exhaust gas may be evenly distributed within the charge air and exhaust gas mixture. In the example embodiment depicted in FIG. 2, the EGR system is a high-pressure EGR system which routes exhaust gas from a location upstream of the turbochargers in the exhaust passage to a location downstream of the turbochargers in the intake passage. In other embodiments, the engine system may additionally or alternatively include a low-pressure EGR system which routes exhaust gas from downstream of the turbochargers in the exhaust passage to a location upstream of the turbochargers in the intake passage.

As depicted in FIG. 2, the engine system further includes a two-stage turbocharger with the first turbocharger 120 and the second turbocharger 124 arranged in series, each of the turbochargers arranged between the intake passage and the exhaust passage. The two-stage turbocharger increases air charge of ambient air drawn into the intake passage in order to provide greater charge density during combustion to increase power output and/or engine-operating efficiency. The first turbocharger operates at a relatively lower pressure, and includes a first turbine 121 which drives a first compressor 122. The first turbine and the first compressor are mechanically coupled via a first shaft 123. The second turbocharger operates at a relatively higher pressure, and includes a second turbine 125 which drives a second compressor 126. The second turbine and the second compressor are mechanically coupled via a second shaft 127. In the example embodiment shown in FIG. 2, the second turbocharger is provided with a wastegate 128 which allows exhaust gas to bypass the second turbocharger. The wastegate may be opened, for example, to divert the exhaust gas flow away from the second turbine. In this manner, the rotating speed of the compressors, and thus the boost provided by the turbochargers to the engine may be regulated during steady state conditions. In other embodiments, each of the turbochargers may be provided with a wastegate, or only the second turbocharger may be provided with a wastegate.

As explained above, the terms "high pressure" and "low pressure" are relative, meaning that "high" pressure is a pressure higher than a "low" pressure. Conversely, a "low" pressure is a pressure lower than a "high" pressure.

The engine system further includes an exhaust treatment system 131 coupled in the exhaust passage in order to reduce regulated emissions. As depicted in FIG. 2, the exhaust gas treatment system is disposed downstream of the first turbine of the first (low pressure) turbocharger. In other embodiments, an exhaust gas treatment system may be additionally or alternatively disposed upstream of the first turbocharger. The exhaust gas treatment system may include one or more components. For example, the exhaust gas treatment system may include one or more of a diesel particulate filter (DPF), a diesel oxidation catalyst (DOC), a selective catalytic reduction (SCR) catalyst, a three-way catalyst, a $NO_x$ trap, and/or various other emission control devices or combinations thereof. In an alternate embodiment, the engine system may not include an exhaust treatment system with a DPF, DOC, or SCR.

The engine system further includes the controller 130, which is provided and configured to control various components related to the engine system, as described above with reference to FIG. 1. The controller may also be referred to herein as the engine controller, or control unit. As described above, the controller includes non-transitory, computer readable storage media (not shown in FIG. 2) including code for enabling on-board monitoring and control of engine operation.

As one example, the controller may receive signals from various temperature sensors and pressure sensors disposed in various locations throughout the engine system. For example, the control unit may receive signals from one or more of the temperature sensor positioned upstream of the EGR cooler, the exhaust pressure sensor positioned upstream of the first and second valves in the EGR system, a non-donor cylinder exhaust pressure sensor 185 positioned in the exhaust passage upstream of the turbochargers, a crankcase pressure sensor (as shown in FIG. 1), and a manifold air temperature (MAT) sensor 181 positioned in the intake manifold. As shown in FIG. 2, the non-donor cylinder exhaust pressure sensor is positioned downstream from an inlet of exhaust from the EGR passage (e.g., downstream from the first valve). In an alternate embodiment, the non-donor cylinder exhaust pressure sensor may be positioned in the non-donor cylinder exhaust manifold and/or upstream of the inlet of exhaust from the EGR passage.

Based on the signals received indicating the EGR temperatures and pressures and the manifold air temperature, for example, one or both of the first valve and the second valve may be adjusted to adjust an amount of exhaust gas flowing through the EGR cooler to control the manifold air temperature or to route a desired amount of exhaust to the intake manifold for EGR.

Figure 3:
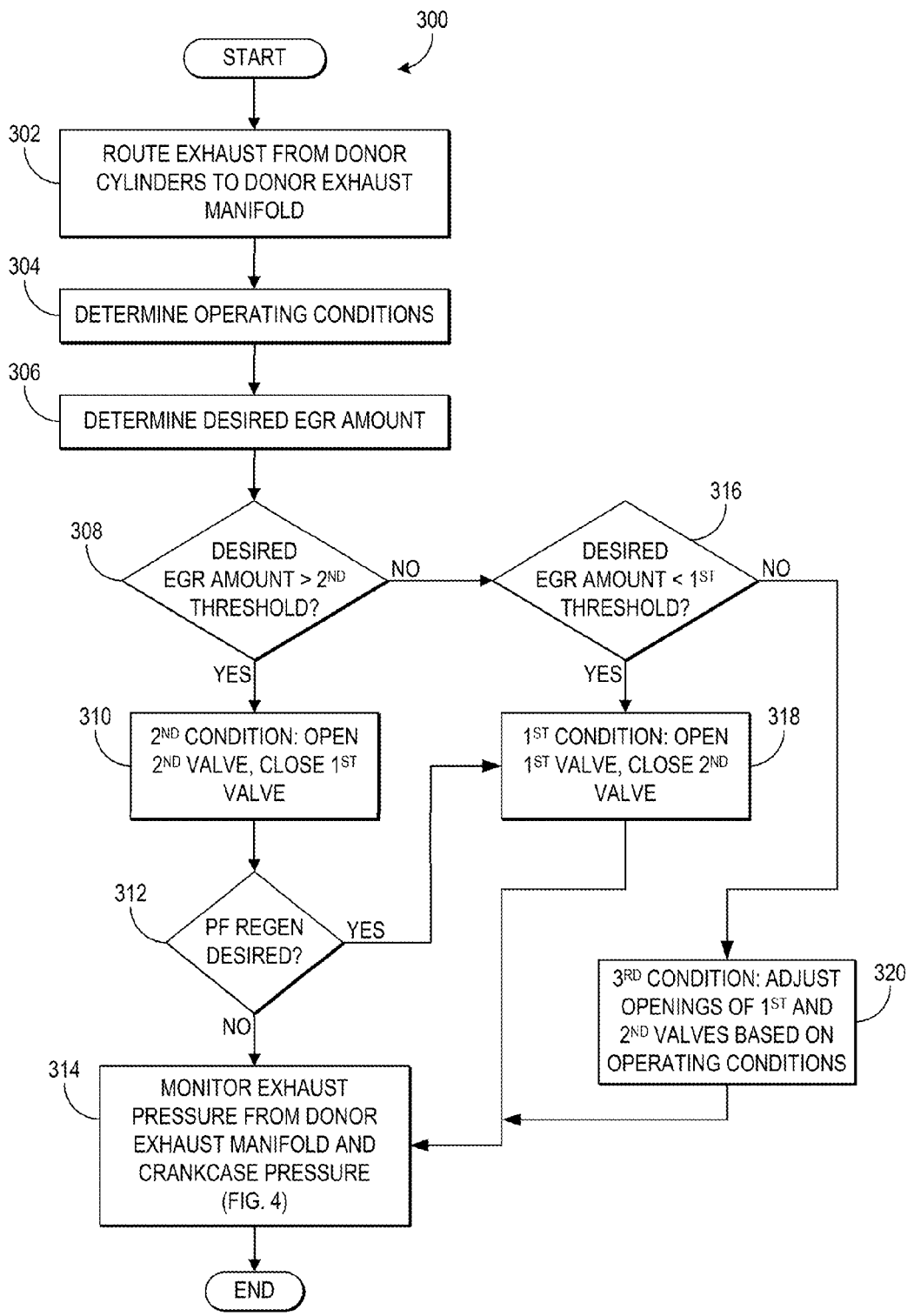
FIG. 3 shows a flow chart illustrating a method for adjusting first and second valves in an exhaust gas recirculation system according to an embodiment of the invention.
Figure 4:
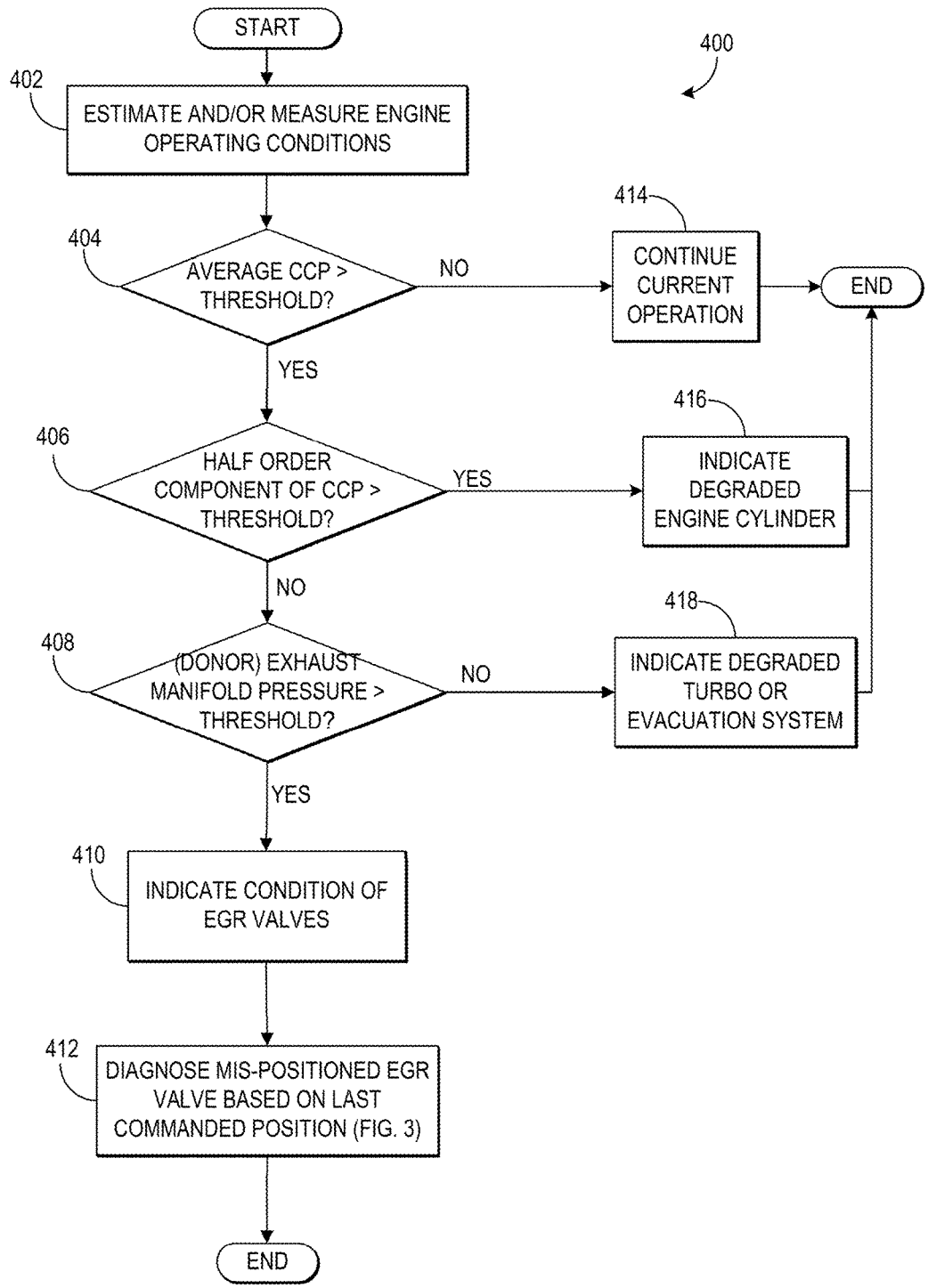
FIG. 4 shows a flow chart illustrating a method for determining a condition of an exhaust gas recirculation valve according to an embodiment of the invention.

FIGS. 3 and 4 show flow charts illustrating methods for an exhaust gas recirculation system with first and second valves, such as the exhaust gas recirculation system 160 described above with reference to FIG. 2. In particular, FIG. 3 shows a method for controlling the first and second valves in the EGR system based on operating conditions. For example, when more EGR is desired, the second valve may be adjusted to be more open and the first valve may be adjusted to be more closed. Likewise, when less EGR is desired, the first valve may be adjusted to be more open and the second valve may be adjusted to be more closed. In this way, an engine controller (e.g., controller 130 shown in FIGS. 1-2) may control the first valve and the second valve together to adjust EGR flow. As will be described below, the system may operate under three conditions based on the positions of the first and second valve. Further, during each of the three conditions, pressure may be monitored in the donor cylinder exhaust manifold and the non-donor cylinder exhaust manifold (or directly downstream of the exhaust manifolds) such that an engine component condition, such as degradation of the valves, may be determined, as described with reference to FIG. 4. Instructions for carrying out the methods of FIG. 3 and FIG. 4 may be stored in a memory of the controller. Further, the methods of FIG. 3 and FIG. 4 may be executed by a processor of the controller.

Continuing to FIG. 3, a flow chart illustrating a method 300 for controlling first and second valves in an exhaust gas recirculation system, such as the first and second valves described above with reference to FIG. 2, is shown. The first and second valves may be disposed in an exhaust passage downstream of a cylinder exhaust valve. For example, the exhaust passage may be the EGR passage 162. Specifically, the method 300 determines current operating conditions (e.g., engine operating conditions) and adjusts the valves based on the operating conditions. For example, the valves may be adjusted based on a desired amount of EGR or to facilitate particulate filter regeneration if the engine includes a particulate filter. It should be noted that in some embodiments, the engine may not include a particulate filter.

At step 302 of the method, exhaust from the donor cylinders is routed to the donor cylinder exhaust manifold. For example, after combustion occurs in each of the donor cylinders, an exhaust valve of each of the cylinders opens such that exhaust may be released from the cylinders into the donor cylinder exhaust manifold. In alternate embodiments, if the engine does not include donor cylinder (or dedicated EGR cylinders), the method at 302 may include routing exhaust from the engine cylinders to one or more exhaust manifolds.

At step 304, operating conditions are determined. As non-limiting examples, the operating conditions may include engine load, engine speed, exhaust temperature, amount of $NO_x$ generation, and the like. Once the operating conditions are determined, a desired amount of EGR is determined at step 306. The desired amount of EGR may be based on conditions such as the amount of $NO_x$ generation. For example, as the amount of $NO_x$ generated during combustion increases or as a target air fuel ratio increases, a greater amount of EGR may be desired, and vice versa. In one embodiment, NOx may be measured by a NOx sensor in the exhaust passage of the engine.

Once the desired amount of EGR is determined, the method proceeds to step 308 where it is determined if the desired amount of EGR is greater than a second threshold. As an example, the second threshold may be close to or approximately a maximum amount of EGR based on the operating conditions. For example, the second threshold may be an amount of EGR that is achievable under the current operating conditions when the first valve is fully closed and the second valve is fully open.

If it is determined that the desired amount of EGR is greater than the second threshold amount, the controller adjusts the first and second valves at 310 such that a second condition is carried out. During the second condition, the second valve is opened substantially more than the first valve, and the first valve is closed more than a threshold amount. In one example, the second valve is opened and the first valve is closed such that substantially all the exhaust from the donor cylinders flows to the intake manifold for exhaust gas recirculation. In this manner, the amount of EGR may be increased to the desired amount.

At step 312, the method includes determining if particulate filter regeneration is desired. Particulate filter regeneration may be desired when a soot level of the particulate filter exceeds a threshold level, for example. The particulate filter may be included as part of an exhaust gas treatment system (such as exhaust gas treatment system 131 shown in FIG. 2). As one example, it may be determined that the soot level is greater than the threshold level based on a pressure drop across the particulate filter or a soot sensor disposed in the particulate filter. In alternate embodiments, the engine system may not include a particulate filter. In this embodiment, the method may proceed directly from 310 to 314.

If it is determined that particulate filter regeneration is not desired (or if no particulate filter is included in the engine system), the method continues to step 314 and the pressure in the donor cylinder exhaust manifold and crankcase pressure are monitored, as will be described in greater detail with reference to FIG. 4. Said another way, the engine controller may monitor the pressure of exhaust from the exhaust manifold routing exhaust to the first and second valves of the EGR system. For example, the exhaust pressure upstream of the first and second EGR valves and the crankcase pressure are measured and/or estimated such that EGR valve degradation (or mis-positioning or sticking or leaking) may be determined.

Returning to step 308, if it is determined that the desired amount of EGR is less than the second threshold, the method moves to step 316 and it is determined if the desired amount of EGR is less than a first threshold. The first threshold may be a minimum amount of EGR, for example, or substantially no EGR. The desired amount of EGR may be less than the first threshold amount during conditions such as low engine load and/or when $NO_x$ generation is less than a threshold level, for example.

If it is determined that the desired amount of EGR is less than the threshold amount at step 316 or if it is determined that particulate filter regeneration is desired at step 312, the method moves to step 318, and the controller adjusts the first and second valves such that a first condition is carried out. During the first condition, the first valve may be opened substantially more than the second valve, and the second valve is closed more than a threshold amount. In one example, the first valve may be fully opened and the second valve may be fully closed such that substantially all the exhaust flows from the donor cylinders to the exhaust manifold. In this manner, the amount of EGR may be substantially reduced, for example. Further, particulate filter regeneration may be carried out under high load conditions, and a temperature of the exhaust may be further increased to facilitate particulate filter regeneration by closing the second valve and opening the first valve such that substantially all the exhaust is routed to the exhaust passage.

In some examples, particulate filter regeneration may be carried out by closing the first and second valves and cutting-off fuel injection to the donor cylinders. In such a configuration, the donor cylinders may work against the valves as only a compressor, thereby increasing the load to the non-donors cylinders. The increased load on the non-donor cylinders allows for higher exhaust gas temperatures in the aftertreatment system, for example, allowing for regeneration of the particulate filter or temperatures that are conducive for active regeneration.

Continuing with FIG. 3, once the first valve is opened and the second valve is closed, the method continues to step 314 where exhaust pressure in the donor cylinder exhaust manifold (or the exhaust pressure upstream of the first and second valves) and crankcase pressure are monitored, as will be described below with reference to FIG. 4.

Returning to step 316, if it is determined that the EGR amount is greater than the first threshold amount (but less than the second threshold amount), the method moves to step 320, and the controller adjusts the first and second valves based on operating conditions such that a third condition is carried out. During the third condition, the first valve and the second valve may be concurrently at least partially opened or opened greater than a threshold amount. In one example, the first valve and the second valve may be opened the same amount. In another example, the first valve may be opened more than the second valve. As yet another example, the second valve may be opened more than the first valve. By concurrently opening the first and second valves at least partially, the amount of EGR may be reduced from the maximum amount of EGR (e.g., when the first valve is fully closed and the second valve is fully open), and relatively different amounts of exhaust may be routed to the intake passage and the exhaust passage.

Once each of the first and second valves is opened greater than a threshold amount, the method continues to step 314 where exhaust pressure from the donor exhaust manifold (or in the exhaust manifold feeding exhaust to the first and second valves in a system without donor cylinder) and the crankcase pressure are monitored, as will be described below with reference to FIG. 4.

Thus, the exhaust gas recirculation system may be operated under several conditions. Specifically, based on engine operating conditions, the controller may adjust the first and second valves together. As shown in FIG. 3, the positions of the first valve and the second valve are tied together in the controls based on engine operating conditions. Under the first condition, the second valve is closed more than a threshold amount and substantially all of the exhaust from the donor cylinders is routed to the exhaust passage. Under the second condition, the first valve is closed more than a threshold amount and substantially all of the exhaust from the donor cylinder is routed to the intake passage. Under the third condition, the first valve and the second valve are each open more than a threshold amount and different portions of exhaust may be routed from the donor cylinders to the intake passage and the exhaust passage. Under each of the conditions, exhaust pressure from the donor cylinder exhaust manifold and crankcase pressure may be monitored such that degradation of a valve in the EGR system may be identified, as described below.

During engine operation, increases in crankcase pressure may indicate a condition of the engine. A condition of the engine may include degradation, improper functioning, or improper positioning of one or more engine system components. In some examples, these conditions of the engine may result in further engine degradation and/or degradation of engine system control. As an example, a condition of the engine may be determined by monitoring the average, or steady-state, crankcase pressure.

For example, a potential engine failure condition may be detected if the average crankcase pressure exceeds an absolute pressure threshold. However, an increase in the average crankcase pressure may be caused by a number of different degraded components and it may be time consuming for the maintenance crew to determine the source of the degraded component during service of the engine. Additionally, in some examples, an increase in the average crankcase pressure over an upper threshold may result in de-rating and/or shutdown of the engine. However, not all types of engine component degradation that may result in this increase in average crankcase pressure may require de-rating of the engine (e.g., degradation of some engine components may not result in further engine degradation or failure).

A condition of the engine may also be diagnosed based on frequency content of crankcase pressure. A suitable example of a frequency content of crankcase pressure can be obtained as follows: the crankcase pressure may be measured (e.g., measure by a crankcase pressure sensor such as the crankcase pressure sensor 170 shown in FIG. 1) to generate a time-domain crankcase pressure signal; and, the time-domain crankcase pressure signal may be sampled and transformed (by a processor of the engine controller) to generate a frequency domain crankcase pressure signal. The frequency domain crankcase pressure signal may include a set of frequency components at different frequencies and magnitudes. The frequency content of the crankcase pressure is the relative magnitudes of frequency components of the frequency domain crankcase pressure signal and/or is the measured frequency content as created with a band-pass filter. Pressure measurements may be performed with a suitable pressure sensor, such as crankcase pressure sensor 170 shown in FIG. 1. A discrete Fourier transform, such as a fast Fourier transform, may be used to generate the frequency domain crankcase pressure signal. Further, the condition of the engine may be diagnosed based on the frequency content of the crankcase pressure.

Figure 5:
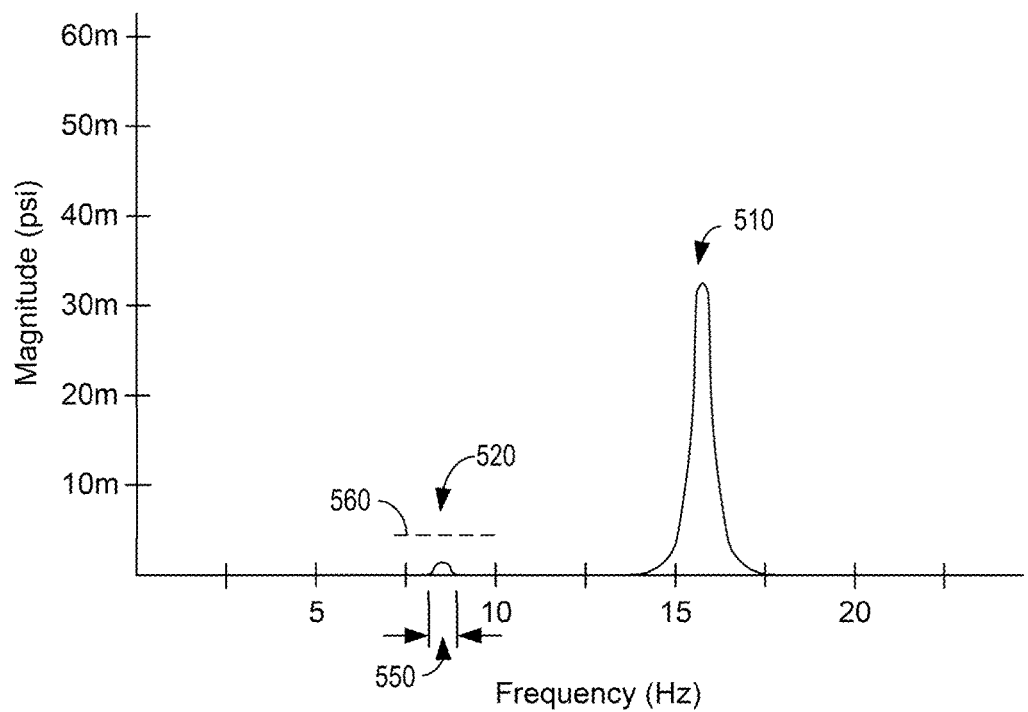
FIGS. 5 and 6 each show data of a frequency-domain crankcase pressure signal according to an embodiment of the invention.

FIG. 5 shows data of a frequency-domain crankcase pressure signal of an engine that may be operating with a healthy crankcase pressure. For example, the engine may be a four stroke engine operating at 1050 RPM. Thus, the first engine order is at 17.5 Hz and the half engine order is at 8.75 Hz. The crankcase pressure may vary with a periodic frequency as crankshaft 250 revolves within crankcase 159. For example, the frequency content of the crankcase pressure may include a peak pressure 510 at the frequency of the first engine order. In other words, the peak magnitude of the frequency content may occur at the first-order frequency component. The first order frequency component may be attributed to local piston movement in the cylinder. For example, in one crankshaft revolution the piston travels from top dead center to bottom dead center and back up to top dead center. Thus, the motion of the piston may cause a pressure wave inside the crankcase at the crankshaft revolution frequency. The first order frequency component may be dominant in the crankcase pressure signal due to the piston dynamics local to the sensor.

The crankcase pressure may also include frequency content at other harmonics of the first-order frequency, such as at a second-order frequency (twice the engine frequency), a third-order frequency (three times the engine frequency), etc. Similarly, the crankcase pressure may include frequency content at frequencies less than the first-order frequency, such as at a half-order frequency (half the engine frequency). FIG. 5 illustrates an example of a half-order component 520, and shows a data graph of a frequency-domain crankcase pressure signal of an engine that may be operating with a healthy crankcase pressure. The graph illustrates pressure magnitudes at discrete frequencies.

A healthy engine may include an average crankcase pressure below a threshold pressure. Further, a healthy engine may include frequency content substantially around the half-order frequency, such as the range of frequencies 550, for example. In one embodiment, the range of frequencies 550 may be plus or minus ten percent of the half-order frequency, depending on engine speed. Frequency content near the half-order frequency may be caused by at least a healthy amount of blow-by from a piston of an engine cylinder. In a healthy engine, the frequency content may include frequency components substantially near the half-order frequency with magnitudes less than a threshold value, such as threshold value 560. An engine may be degraded when one or more components of the engine have degraded. The degraded components may cause the engine to operate less efficiently, with less power, and/or with more pollution, for example. Further, the condition of the degraded components may accelerate degradation of the components which may increase the likelihood of catastrophic engine failure and road failure.

A degraded cylinder is an example of a degraded engine component. Blow-by may be increased for a degraded cylinder compared to a healthy cylinder. Increased blow-by may cause a transient pressure spike as the high pressure gasses from an engine cylinder escape into the crankcase. The transient pressure spike may occur at the frequency that the degraded cylinder is firing. Thus, for a four-stroke engine, the transient pressure spike may occur at the half-order frequency. For a two-stroke engine, the transient pressure spike may occur at the first-order frequency. Thus, it may be desirable to identify the frequency content of the crankcase pressure substantially near half-order frequency 520, such as the range of frequencies 550, for example.

Figure 6:
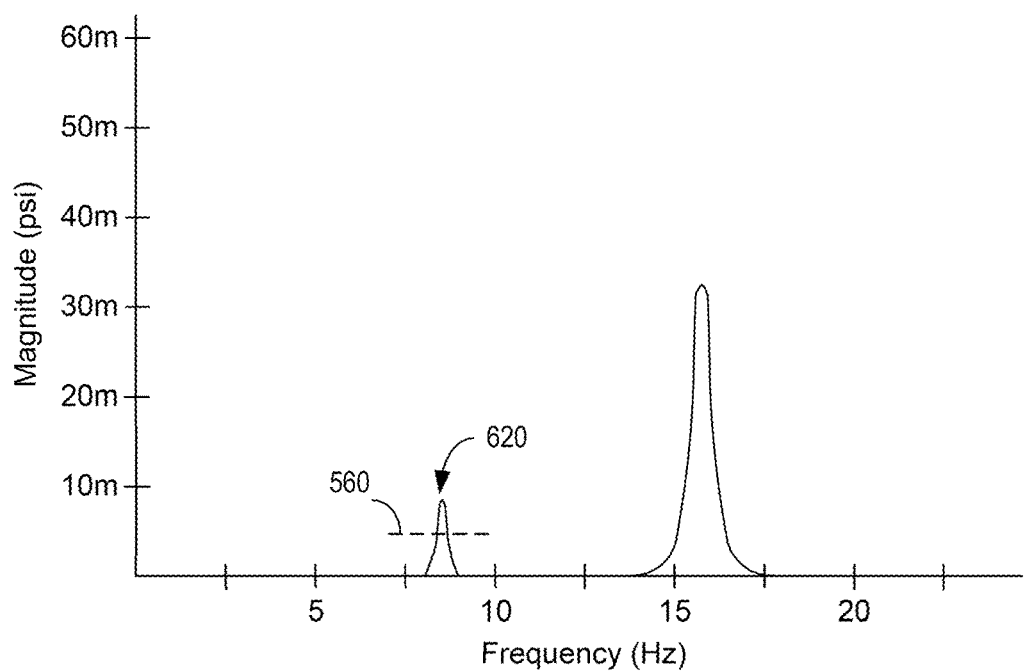

Frequency content near the half-order frequency may be caused by different amounts of blow-by escaping from each of the cylinders of a multi-cylinder engine, for example. The differences may be caused by differing wear patterns or manufacturing differences of each cylinder, for example. Thus, the frequency content of a healthy engine may include frequency components substantially near the half-order frequency with magnitudes less than a threshold value, such as threshold value 560. However, a degraded cylinder may have increased blow-by, and the frequency content of a four stroke engine with the degraded cylinder may include frequency components substantially near the half-order frequency with magnitudes greater than threshold value 560. For example, FIG. 6 illustrates data that may indicate a degraded cylinder, where half-order component 620 exceeds threshold value 560, and the data shows a frequency-domain crankcase pressure signal of an engine that may be operating with a crankcase pressure that indicates a particular type of cylinder degradation. For example, the engine of FIG. 6 may have a degraded component causing blow-by, such as worn piston rings. The diagnosis, then, may include both a warning of degradation as well as an indication of the type and/or location of the degraded engine component.

Thus, in one embodiment, a degraded cylinder of a four stroke engine may be detected based on a frequency content signature, such as the magnitude of the half-order frequency component being greater than a half-order threshold value. In an alternate embodiment, the magnitudes of the frequency content may be integrated over the range of frequencies 550, and a degraded cylinder of a four stroke engine may be detected based on the integration being greater than an integral threshold value.

Detection of one degraded cylinder, where the other cylinders of the engine are more healthy (or less degraded), may have a more clear frequency content signature than when multiple cylinders of the engine are degraded. For example, the frequency content signature of one degraded cylinder may be identified by comparing the magnitude of the half-order frequency component to a half-order magnitude threshold value. However, multiple degraded cylinders may have a different frequency component signature than a single degraded cylinder. Further, the position in the firing order of multiple degraded cylinders may change the frequency content signature. For example, two degraded cylinders 180° out of phase may have a different frequency component signature than two degraded cylinders in successive firing order, and thus the methods disclosed herein may identify one or more degraded cylinders based on various changes in the frequency content signature. Further, it may be beneficial to generate a frequency content signature of a healthy engine by recording frequency content at various frequencies and operating conditions. In one embodiment, the frequency content of the engine may be compared to the frequency content signature of a healthy engine. Anomalies not matching the frequency content signature of the healthy engine or a different degraded engine component may be identified and reported by the controller, for example.

Another example of a degraded engine component is a degraded crankcase evacuation system. For example, the degraded crankcase evacuation system may not vent gasses from the crankcase at a high enough rate which may cause the average or peak crankcase pressure to exceed an average crankcase pressure threshold value. The degraded crankcase evacuation system may affect all cylinders of a multi-cylinder engine in a similar way and so the half-order frequency components may not be largely affected by the degraded crankcase evacuation system. In one embodiment, a potentially degraded crankcase evacuation system may be diagnosed by identifying the average crankcase pressure exceeds the average crankcase pressure threshold value and frequency content of the crankcase pressure includes a half-order frequency component that is less than a half-order threshold value. Each of the average crankcase pressure and half-order threshold values may be based on one or more of engine speed, engine load, crankcase temperature, and historical engine data, for example.

Another example of a degraded engine component is a degraded turbocharger. In one embodiment, the turbocharger may include a seal that is lubricated by engine oil that drains into the crankcase. A degraded seal of the turbocharger may provide a path for high pressure boosted air and/or exhaust gas to enter the crankcase from the turbocharger, for example. The degraded turbocharger may affect all cylinders of a multi-cylinder engine in a similar way and so the half-order frequency components may not be largely affected by the degraded turbocharger. In one embodiment, a potentially degraded turbocharger may be diagnosed by identifying an average crankcase pressure exceeding an average crankcase pressure threshold value and frequency content of the crankcase pressure including a half-order frequency component that is less than a half-order threshold value.

Another example of a degraded engine component is a degraded crankcase. For example, a healthy engine may include a crankcase that is a substantially closed system. When the crankcase is substantially closed, the motion of the piston may cause a pressure wave inside the crankcase at the crankshaft revolution frequency, e.g. at the first order frequency. However, a degraded crankcase may include a crankcase door that has been blown open during operation or a crankcase door that has been improperly replaced or sealed during routine maintenance, etc. When the crankcase is degraded, the crankcase may be open to the atmosphere raising the average crankcase pressure and affecting the dynamics of the pressure wave inside the crankcase at the crankshaft revolution frequency. As one example, the average crankcase pressure may rise to within 0.5 In—H2O of atmospheric pressure and the first order frequency response of the crankcase pressure signal may be significantly decreased when the crankcase is degraded. The degraded crankcase may affect all cylinders of a multi-cylinder engine in a similar way and so the half-order frequency components may not be largely affected by the degraded crankcase. Thus, in one embodiment, a potentially degraded crankcase may be diagnosed by identifying an average crankcase pressure exceeding an average crankcase pressure threshold value and frequency content of the crankcase pressure including a first-order frequency component that is less than a first-order threshold value. In another embodiment, a potentially degraded crankcase may be diagnosed by identifying an average crankcase pressure exceeding an average crankcase pressure threshold value and frequency content of the crankcase pressure including a first-order frequency component that is less than a first-order threshold value and a half-order frequency component that is less than a first-order threshold value.

Yet another example of a degraded engine component is an EGR valve (e.g., one or more of first valve 164 and second valve 171. As described above, one of more valves of the EGR system, downstream from the engine cylinder and the engine cylinder valves, may become degraded (e.g., mechanical degradation) or stuck in one position. These valves may also be mis-positioned (e.g., be in a position different than desired or commanded) or may be leaking. As a result, the average crankcase pressure may increase. For example, if both EGR valves (e.g., both of the first valve and the second valve) are closed when at least one of the two valves should be at least partially opened, the average crankcase pressure may increase. The degraded EGR valves may affect all cylinders of a multi-cylinder engine in a similar way and so the half-order frequency components may not be largely affected by the degraded valves. In one embodiment, a potentially degraded, stuck, or mis-positioned EGR valve may be diagnosed by identifying an average crankcase pressure exceeding an average crankcase pressure threshold value and frequency content of the crankcase pressure including a half-order frequency component that is less than a half-order threshold value. Additionally, as described further below, degradation of one or more of the EGR valves may be confirmed based on a pressure of an exhaust manifold increasing during the increase in the average crankcase pressure (e.g., increasing over a threshold exhaust manifold pressure). The exhaust manifold may be an exhaust manifold flowing exhaust to an exhaust passage in which the first and second EGR valves are disposed.

The above examples illustrate various approaches for distinguishing between different types of engine degradation based on the frequency content of the crankcase pressure during engine operation.

Continuing to FIG. 4, a flow chart illustrating a method for determining a condition of a valve disposed in a first exhaust passage downstream from a cylinder exhaust valve is shown. For example, the valve may be one of a first valve and a second valve, both being disposed (e.g., located) in an exhaust gas recirculation (EGR) system, such as the EGR system 160 shown in FIG. 2, which selectively routes exhaust from the engine to a second exhaust passage via the first valve and to an intake passage via the second valve. The second exhaust passage may be an exhaust passage routing exhaust to a turbocharger and the intake passage may be an intake passage routine intake air to the engine. As shown in FIG. 3, positions of both the first valve and the second valve may be adjusted together based on engine operating conditions. The condition of the valve may include one or more of a degraded EGR valve, a stuck EGR valve, a mis-positioned EGR valve (e.g., closed when it is commanded to be open), or the like. As defined herein, mis-positioned may include a valve in a position different than commanded. This may include the valve being closed when commanded open or open when commanded closed. This may also include the position of the valve being a threshold percentage different than commanded (e.g., 50% open instead of a commanded 20% open). Mis-positioning thresholds of the valve may also include expected hysteresis of the valve over time or due to operating conditions (e.g., the slack that comes from normal part wear, temperature differentials, or the like). The condition of the valve may be based on an exhaust pressure of a set of donor cylinders and a crankcase pressure. In another example, the condition may be based on an exhaust pressure directly upstream of the first and second EGR valves and a crankcase pressure. The exhaust pressure used in method 400 may be estimated and/or measured based on an output of a pressure sensor positioned in or downstream of the donor exhaust manifold (e.g., such as pressure sensor 183 shown in FIG. 2). Similarly, the crankcase pressure used in method 400 may be measured based on an output of a pressure sensor positioned in the crankcase (such as crankcase pressure sensor 170 shown in FIG. 1). As used herein, valve degradation may include a mispositioned valve, a stuck valve, and/or a valve with degraded function. In another example, method 400 may be used to diagnose a position of each EGR valve. As shown in FIG. 2, a first EGR valve controls exhaust flow from the donor cylinders and to the exhaust passage while the second EGR valve controls exhaust flow from the donor cylinders and to the intake passage.

Method 400 begins at 402 by estimating and/or measuring engine operating conditions. Engine operating conditions may include engine speed and load, notch level, exhaust temperature, exhaust NOx level, exhaust oxygen level, exhaust pressure of a donor cylinder exhaust manifold, exhaust pressure of a non-donor cylinder exhaust manifold, turbine speed, engine fueling, crankcase pressure, or the like. At 402, the method includes determining if an average crankcase pressure (CCP) is greater than a threshold value. Said another way, the method at 402 may include determining if an average (also referred to as a steady-state value) of the measured CCP signal is greater than a steady-state threshold value for the CCP. If the average CCP is not greater than the threshold value of the average CCP, the method continues to 414 to continue current engine operation and not indicate a condition of the engine.

Alternately, if the average CCP (e.g., steady-state value of the CCP) is greater than the corresponding threshold value, the method continues to 406 to determine if the half-order frequency component of the CCP is greater than a threshold half-order pressure. As described above, the half-order frequency component of the CCP may be a half-order frequency component of the crankcase pressure sensor data received at the processor of the controller from the crankcase pressure sensor. If the controller determines that the half-order frequency component of the CCP is greater than the threshold half-order pressure, the method continues to 416 to indicate potential degradation of one or more engine cylinders.

The method at 416 may further include performing a frequency analysis to determine which cylinder is degraded. In one embodiment, time-domain measurements may be used to identify the degraded cylinder. For example, the crankcase pressure may peak periodically, and the peak may be correlated with one or more of a crankshaft position, a camshaft position, and a fuel injection sequence. Thus, in one embodiment, the degraded cylinder may be identified by correlating time-domain crankcase pressure information to one or more of a crankshaft position, camshaft position, and a fuel injection sequence.

As another example, the degraded cylinder may be identified by correlating time-domain crankcase pressure information to engine firing order. Further, a correlation algorithm may compensate for pressure wave transport lag between the degraded cylinder and the pressure sensor. More specifically, the measured CCP signal (e.g., from the crankcase pressure sensor) may be transformed as described above into different frequency components (e.g., half-order and first-order). Each order frequency component includes a magnitude and phase value. The magnitude relates to a strength of the oscillation while the phase relates to the timing of the oscillation. When the magnitude of the half-order component is greater than the threshold, it is determined at 416 that an engine cylinder is degraded. The phase difference between the first and half-order frequency component may then be used at 416 to determine the timing of the degraded cylinder and its position on the engine. The first order frequency component of the CCP signal may always have the same phase, while the phase of the half-order component may vary depending on the degraded cylinder.

FIG. 8 shows an example cylinder configuration relative to a crankcase pressure sensor 170 in a six-cylinder engine. As shown in FIG. 8, the engine includes six cylinders arranged in a line from first cylinder 802 (cylinder 1), second cylinder 804 (cylinder 2), third cylinder 806 (cylinder 3), fourth cylinder 808 (cylinder 4), fifth cylinder 810 (cylinder 5), and sixth cylinder 812 (cylinder 6). Cylinder 1 is positioned closes to the crankcase pressure sensor while cylinder 6 is positioned furthest away from the crankcase position sensor. In this example, the cylinder firing order is 1-5-3-6-2-4, as shown by the firing order schematic 814. However, in alternate examples, a different firing order and/or different number or orientation of cylinders is possible. As one example, if the CCP signal is measured close to the leaking cylinder (e.g., close to crankcase pressure sensor 170), the phase difference (e.g., phase shift) between the half and first-order frequency component of the CCP may be approximately 270°. The phase of the blow-by pulse (e.g., pulse at half-order frequency) of the other cylinders further away from the crankcase pressure sensor 170 may then depend on which cylinder in the firing order is leaking and, because the pressure wave travels at the speed of sound, the distance away from the CCP sensor 170. The combination of firing order and travel delay may then allow the determination of the leaking cylinder.

FIG. 9 shows an example of CCP time domain and frequency domain data for blow-by in the first engine cylinder of FIG. 8. Specifically, graph 902 shows the cylinder motion component of the time domain CCP signal and graph 904 shows the cylinder blow-by pulse of the time domain CCP signal of cylinder 1. The combined time domain CCP signal is shown in graph 906. After performing a frequency analysis of the time domain CCP signal (e.g., using FFT as described above), the resulting magnitude and phase components of the CCP frequency spectra are shown at graphs 908 and 910, respectively. The magnitude of the half-order component, as shown at 912, may be above the threshold. Additionally, the phase difference between the phase of the half-order component 914 and the phase of the first-order component 916 may be approximately 270°. As such, if a phase difference between the half and first-order frequency components of the CCP is determined to be approximately 270° at 416 in method 400, the controller may indicate that the first cylinder, arranged closes to the CCP sensor, is the degraded cylinder.

FIG. 10 shows an example of CCP time domain and frequency domain data for blow-by in the third engine cylinder of FIG. 8. Specifically, graph 1002 shows the cylinder motion component of the time domain CCP signal and graph 1004 shows the cylinder blow-by pulse of the time domain CCP signal of cylinder 3. The combined time domain CCP signal is shown in graph 1006. After performing a frequency analysis of the time domain CCP signal (e.g., using FFT as described above), the resulting magnitude and phase components of the CCP frequency spectra are shown at graphs 1008 and 1010, respectively. The magnitude of the half-order component, as shown at 1012, may be above the threshold. Additionally, the phase difference between the phase of the half-order component 1014 and the phase of the first-order component 1016 may be approximately −191°. As such, if a phase difference between the half and first-order frequency components of the CCP is determined to be approximately −191° at 416 in method 400, the controller may indicate that the third cylinder, arranged further away from the CCP sensor than the first cylinder, is the degraded cylinder.

It should be noted that the phase differences outlined above for each of the degraded cylinders are examples and the phase differences for blow-by may be different for different engine configurations with different numbers of cylinders. Thus, engine testing may be performed to determine the phase shifts for each of the cylinders based on the distance from the CCP sensor and the engine firing order. The phase shifts indicating blow-by (e.g., degradation) for each cylinder may then be pre-determined and stored in the memory of the controller (e.g., in a look-up table). The method at 416 may then reference this look-up table after performing the CCP frequency analysis to determine which of the engine cylinder is degraded and potentially experiencing increased blow-by.

Returning to FIG. 4, if instead at 406 the half-order frequency component of the CCP is not greater than the corresponding threshold, the method continues to 408 to determine if the exhaust manifold pressure of the exhaust manifold upstream of the EGR valves is greater than a threshold manifold pressure. Said another way, the exhaust manifold pressure may be a pressure of the exhaust manifold feeding exhaust to a passage in which the first and second EGR valves are located. In yet another example, the exhaust manifold pressure may be a donor exhaust manifold pressure. In another embodiment, the method at 408 may include determining if an increase in the exhaust manifold pressure is increasing above a threshold rate. If the exhaust manifold pressure in not over the threshold at 408 (or the exhaust manifold pressure is not increasing at the threshold rate or by the threshold amount), the method continues to 418 to indicate potential degradation of the turbocharger, evacuation system of the crankcase, and/or crankcase. If a first-order frequency component of the CCP is also less than a first-order threshold, the method at 418 may include indicating potential degradation of the crankcase and not the turbocharger or the evacuation system.

Alternately, if the exhaust manifold pressure is greater than the corresponding threshold at 408, the method proceeds to 410 to indicate a condition of the EGR valves. In one embodiment, indicating the condition (or potential fault) of the EGR valves may include reporting the condition to the locomotive operating crew via a display (e.g., display 140 shown in FIG. 1) and the operator may then adjust operation of the vehicle to reduce the potential of further degradation. In another embodiment, indicating the condition of the EGR valves may include sending a message diagnosing the potential fault as a degraded EGR valve via a communications system (e.g., communications system 144 shown in FIG. 1) to a command center and displaying the transmitted message in the command center. In yet another example, indicating the condition of the EGR valves may include setting a diagnostic code indicating potential degradation. Similarly, the steps at 416 and 418 may include similar procedures to indicate degradation of the diagnosed components.

From 410, the method continues to 412 to diagnose a mis-positioned EGR valve based on the last commanded position, as determined by the method shown at FIG. 2. For example, if the two EGR valves are supposed to be in the second condition with the second valve opened and the first valve closed, the second valve may actually be closed (or at least partially closed), thereby resulting in the increase in the exhaust manifold pressure upstream of the second valve and the increase in the steady-state value of the CCP. In another example, if the two EGR valves are supposed to be (e.g., commanded to) the first condition with the first valve opened and the second valve closed, the first valve may be closed (or closed to a greater degree than commanded), thereby resulting in the increase in exhaust manifold pressure upstream of the first valve and the increase in the steady-state value of the CCP. In one example, the method at 412 may further include actuating the indicated first or second valve in attempt to un-stick the valve.

Turning to FIG. 7, a graphical example of changes in exhaust pressure and crankcase pressure due to a condition of different engine system components is shown. Specifically, graph 700 shows changes in an exhaust manifold pressure, measured upstream of the first EGR valve and the second EGR valve, at plot 702, changes in an average (e.g., steady-state) value of a crankcase pressure (CCP) at plot 704, changes in a position of a first EGR valve selectively routing exhaust to an engine exhaust passage at plot 706, changes in a position of a second EGR valve selectively routine exhaust to an engine intake passage at plot 708, changes in a half-order frequency component of the CCP at plot 710, and an indication of a condition of the first and second EGR valves at plot 712. In one example, the exhaust manifold pressure may be a donor exhaust manifold pressure. Additionally the position of each of the first EGR valve and the second EGR valve may be any position between and including a fully open and fully closed position.

Prior to time t1, an average CCP is increasing (plot 704) while a first valve of the EGR system is commanded open (plot 706) and a second valve of the EGR system is commanded closed (plot 708). At time t1, the average CCP (e.g., the steady-state value of the CCP signal from the CCP sensor) increases above a threshold crankcase pressure 714 (plot 704). In response to the average CCP increasing over the threshold crankcase pressure 714 while the exhaust pressure of the engine cylinders routing exhaust to the first and second valves (e.g., donor cylinder manifold pressure) is increasing (plot 702), the controller may indicate a condition of the first valve and/or the second valve (plot 712). Since the first valve is supposed to be open (plot 706), the controller may indicate that the first valve is mis-positioned, stuck in a closed position, and/or degraded. The controller may confirm the condition of the first valve and/or the second valve based on the half-order frequency component of the CCP not being greater than a threshold half-order pressure 716 (plot 710). Confirming the condition of a component may be a prerequisite to indicating degradation, or lack of degradation, of said component.

After a period of time passes, at time t2, the average CCP may again be increasing (plot 704) while the first valve is commanded closed and the second valve is commanded open. At time t3, the average CCP (e.g., the steady-state value of the CCP signal from the CCP sensor) increases above the threshold crankcase pressure 714 (plot 704). In response to the average CCP increasing over the threshold crankcase pressure 714 while the exhaust pressure of the cylinders routing exhaust to the first and second valves is not increasing (e.g., the rate of increase is below a threshold and/or the exhaust pressure is below a threshold value) and when the half-order frequency component of the CCP is less than the threshold half-order pressure 716 (plot 710), the controller indicates a condition of the turbocharger, crankcase, or crankcase evacuation system and not an engine cylinder or the first and second EGR valves. In one example, indicating the condition includes indicating degradation of one or more of the turbocharger, crankcase, or crankcase evacuation system.

After another period of time passes, at time t4, the half-order frequency component of the CCP is greater than the threshold half-order pressure 716 (plot 710), the average CCP is less than the threshold crankcase pressure 714, and the exhaust pressure of the cylinders routing exhaust to the first and second valves is not increasing. In response, the controller indicates a condition of an engine cylinder. In one example, indicating the condition of the engine cylinder includes indicating engine cylinder degradation.

In this way, an engine controller may differentiate between engine cylinder degradation, turbocharger or crankcase evacuation system degradation, and a condition (such as degradation or mis-positioning) of one or more of the first valve and the second valve of the EGR system based on a half-order frequency component of the crankcase pressure. The condition of the first valve and/or the second valve may be confirmed based on an exhaust manifold pressure of an exhaust manifold routing exhaust to an exhaust passage in which the first and second EGR valves are disposed. As such, the technical effect of indicating a condition of a valve disposed in an exhaust passage downstream from a cylinder exhaust valve based on crankcase pressure may be achieved. In this way, a stuck, mis-positioned, or degraded EGR valve may be diagnosed while also differentiating the EGR valve condition from another type of engine system condition that may cause and increase in crankcase pressure. Thus, the engine may not be de-rated or shutdown automatically by the control system in response to a crankcase pressure over a threshold when one or more EGR valves are causing the crankcase pressure to increase.

As one embodiment, a method for an engine comprises indicating a condition of a valve disposed in a first exhaust passage downstream from a cylinder exhaust valve based at least in part on a crankcase pressure. The valve is one of a first valve and a second valve, both being disposed in an exhaust gas recirculation (EGR) system, and the EGR system selectively routes exhaust from the engine to a second exhaust passage via the first valve and to an intake passage via the second valve, and positions of both the first valve and of the second valve are adjusted together based on engine operating conditions. As such, the first exhaust passage may be an EGR passage of the EGR system. The method further comprises indicating a condition of at least one of the first valve and the second valve based at least in part on a measured value of the crankcase pressure being over a threshold crankcase pressure while a measured pressure of an exhaust manifold of the engine is increasing. In one example, the exhaust manifold may be an exhaust manifold flowing exhaust to the first passage.

As an example, indicating a condition of at least one of the first valve and of the second valve includes indicating one or more of: mis-positioning, or degradation, or sticking, or leaking of one or more of the first valve and the second valve. The method further comprises diagnosing which of the first valve or the second valve is being indicated based at least in part on commanded positions of the first valve and of the second valve. For example, the commanded positions may be a previously commanded position of each of the first valve and the second valve.

The indicating includes one or more of: alerting a vehicle operator, or setting a diagnostic flag, or affecting (e.g., adjusting) an operating parameter of the engine, or alerting an off-board monitor, or actuating the indicated first valve or the second valve to un-stick the indicated valve. The method further comprises differentiating between engine cylinder degradation and another engine component degradation based at least in part on a frequency content of crankcase pressure sensor data. In one example, the crankcase pressure sensor data is a crankcase pressure received at an engine controller from a crankcase pressure sensor located in the engine crankcase. The method further comprises indicating engine cylinder degradation in response to a half-order frequency component of the crankcase pressure sensor data over a threshold half-order pressure; and indicating degradation of another engine component when a steady-state value of the crankcase pressure is greater than a steady-state threshold value for the crankcase pressure, and the half-order frequency component of the crankcase pressure sensor data is not over the threshold half-order pressure value. The method further comprises differentiating between turbocharger degradation and degradation of the valve based at least in part on an exhaust manifold pressure of the engine, the exhaust manifold pressure being a pressure of an exhaust manifold flowing exhaust to the first exhaust passage.

In one example, the valve is one of a first valve and a second valve, both being disposed in an exhaust gas recirculation (EGR) system, and the EGR system selectively routes exhaust from a subset of engine cylinders to a second exhaust passage via the first valve and to an intake passage via the second valve, wherein the indicating the condition of the valve is based on an average crankcase pressure, and further comprising indicating the condition of the valve when the average crankcase pressure is greater than a threshold crankcase pressure value and a donor cylinder exhaust manifold pressure is greater than a threshold manifold pressure.

As another embodiment, a system comprises a crankcase pressure sensor operable to measure a crankcase pressure of a crankcase in an engine; an exhaust gas recirculation (EGR) system; a first valve configured to route exhaust to an exhaust passage of the engine; a second valve configured to route exhaust to an intake passage of the engine; and a controller configured to: indicate a condition of one of the first valve and the second valve based at least in part on the crankcase pressure, the first valve and second valve disposed in a passage downstream from a cylinder exhaust valve.

As yet another embodiment, a method for an engine comprises: selectively routing exhaust from a subset of engine cylinders to an exhaust passage via a first valve and to an intake passage via a second valve; during a first condition when an average crankcase pressure is greater than a threshold crankcase pressure while an exhaust pressure of the subset of engine cylinders is increasing, indicating a condition of one or more of the first valve or second valve; and during a second condition when the average crankcase pressure is greater than the threshold crankcase pressure and the exhaust pressure of the subset of engine cylinders is not increasing, indicating a condition of an alternate engine system component. The condition of one or more of the first valve or second valve is valve degradation, leaking, sticking, or mis-positioning, and the condition of the alternate system component is degradation, and the alternate engine system component is one or more of a turbocharger, a crankcase evacuation system, or one or more engine cylinders.

The method further comprises differentiating between engine cylinder degradation, turbocharger or crankcase evacuation system degradation, and degradation of one or more of the first valve and the second valve based on a half-order frequency component of a crankcase pressure. The method further comprises indicating engine cylinder degradation when the half-order frequency component of the crankcase pressure is greater than a threshold half-order pressure. Additionally, the method comprises shutting down the engine in response to the average crankcase pressure increasing above the threshold crankcase pressure.

The method further comprises indicating turbocharger or crankcase evacuation system degradation when the average crankcase pressure is greater than the threshold crankcase pressure, the half-order frequency component of the crankcase pressure is not greater than the threshold half-order pressure, and the exhaust pressure of the subset of engine cylinders is not over a threshold manifold pressure. Additionally, during the first condition, the method comprises confirming the condition of one or more of the first valve and the second valve based on the half order frequency component of a crankcase pressure not being greater than the threshold half-order pressure. The method further comprises during the first condition, not sending a signal to shut down or de-rate the engine.

As another embodiment, a system comprises a crankcase pressure sensor operable to measure a crankcase pressure of a crankcase in an engine; an exhaust gas recirculation (EGR) system; a first valve configured to route exhaust to an exhaust passage of the engine; a second valve configured to route exhaust to an intake passage of the engine; and a controller configured to: selectively route exhaust from a subset of engine cylinders to the exhaust passage via the first valve and to the intake passage via the second valve; during a first condition when an average crankcase pressure is greater than a threshold crankcase pressure while an exhaust pressure of the subset of engine cylinders is increasing, indicate a condition of one or more of the first valve or second valve; and during a second condition when the average crankcase pressure is greater than the threshold crankcase pressure and the exhaust pressure of the subset of engine cylinders is not increasing, indicate a condition of an alternate engine system component.

As yet another embodiment, a system comprises a crankcase pressure sensor operable to measure a crankcase pressure of a crankcase in an engine; an exhaust gas recirculation (EGR) system; a first valve configured to route exhaust to an exhaust passage of the engine; a second valve configured to route exhaust to an intake passage of the engine; and a controller configured to: indicate a condition of the EGR system based at least in part on a signal received from the crankcase pressure sensor. The system further comprises an exhaust manifold pressure sensor positioned in an exhaust manifold, upstream of the first valve and the second valve, and the exhaust manifold pressure sensor is configured to measure an exhaust pressure, and the controller is further configured to indicate the condition of the EGR system when a steady-state value from the crankcase pressure sensor is over a threshold crankcase pressure value while the exhaust pressure is over a threshold exhaust pressure. The condition of the EGR system includes one or more of degradation, leaking, sticking, or mis-positioning of one or more of the first valve and of the second valve. The controller is further configured to confirm the condition of the EGR system when a half-order frequency component of the signal from the crankcase pressure sensor is less than a threshold half-order frequency.

In another embodiment, a method (e.g., method for controlling an engine) comprises generating, by a controller, first control signals based at least in part on a crankcase pressure. The first control signals are indicative of a condition of a valve disposed in a first exhaust passage downstream from a cylinder exhaust valve, and are configured to control at least one of the engine (e.g., a device associated with the engine) or another device (e.g., such as a display or other device for alerting an operator, or a memory unit for storing information about the condition). The method may further comprise receiving, by the controller, first data signals from a crankcase pressure sensor that is operably coupled with the crankcase to measure the crankcase pressure, the data signals including information about the crankcase pressure. Alternatively or additionally, the method may further comprise the controller receiving second data signals (e.g., from other sensors or controllers/control units) indicative of one or more engine operating conditions, and the controller determining the crankcase pressure based on the second data signals that are received, and/or the controller determining the crankcase pressure based on the engine operating conditions that are determined some other way (e.g., the controller estimating the engine operating conditions based on a current operating mode of the engine, the engine configuration, etc.)

In another embodiment, a method (e.g., method for controlling an engine) comprises generating, by a controller, first control signals based at least in part on a crankcase pressure. The first control signals are indicative of a condition of at least one of a first valve or a second valve disposed in a first exhaust passage downstream from a cylinder exhaust valve in an exhaust gas recirculation (EGR) system. The first control signals are configured to control at least one of the engine (e.g., a device associated with the engine) or another device (e.g., such as a display or other device for alerting an operator, or a memory unit for storing information about the condition). The controller is configured to control the first valve and the second valve (e.g., by generating second control signals, or via the first control signals) based on engine operating conditions, to adjust positions of the first valve and the second valve EGR system for selectively routing exhaust from the engine to a second exhaust passage via the first valve and to an intake passage via the second valve.

In another embodiment, a method (e.g., method for controlling an engine) comprises generating, by a controller, first control signals based at least in part on a measured value of a crankcase pressure (of a crankcase of the engine) being over a threshold crankcase pressure while a measured pressure of an exhaust manifold of the engine is increasing. The first control signals are indicative of a condition of at least one of a first valve or a second valve disposed in a first exhaust passage downstream from a cylinder exhaust valve in an exhaust gas recirculation (EGR) system. The first control signals are configured to control at least one of the engine (e.g., a device associated with the engine, such as the first and/or second valves) or another device (e.g., such as a display for alerting an operator, or a memory unit for storing information about the condition, or an off-board system for storing information or generating an alert on a display or other device). The controller is configured to control the first valve and the second valve (e.g., by generating second control signals, or via the first control signals) based on engine operating conditions, to adjust positions of the first valve and the second valve EGR system for selectively routing exhaust from the engine to a second exhaust passage via the first valve and to an intake passage via the second valve. The first control signals may be indicative of mis-positioning of the first valve and/or the second valve, and/or degradation of the first valve and/or the second valve, and/or sticking of the first valve and/or the second valve, and/or leaking of the first valve and/or the second valve. The method further comprises the controller diagnosing which of the first valve or the second valve is being indicated (e.g., indicated as being mis-positioned, degraded, stuck, and/or leaking) based at least in part on positions of the first valve and of the second valve as controlled by the controller (or another controller/control unit).

In another embodiment, a method (e.g., method for controlling an engine) comprises generating, by a controller, first control signals based at least in part on a crankcase pressure. The first control signals are indicative of a condition of a valve disposed in a first exhaust passage downstream from a cylinder exhaust valve, and are configured to control at least one of the engine (e.g., a device associated with the engine) or another device (e.g., such as a display or other device for alerting an operator, or a memory unit for storing information about the condition). The method further comprises: receiving, by the controller, first data signals from a crankcase pressure sensor that is operably coupled with the crankcase to measure the crankcase pressure, the data signals including information about the crankcase pressure; the controller determining a frequency content of the first data signals; the controller differentiating between engine cylinder degradation and another engine component degradation based at least in part on the frequency content; and the controller generating the first control signals and/or second control signals based on the differentiated engine cylinder degradation and another engine component degradation. For example, the method may comprise the controller indicating engine cylinder degradation in response to a half-order frequency component of the first data signals being over a threshold half-order pressure; and the controller indicating degradation of another engine component when a steady-state value of the crankcase pressure is greater than a steady-state threshold value for the crankcase pressure, and the half-order frequency component of the first data signals is not over the threshold half-order pressure value.

In another embodiment of the method, the method additionally or alternatively comprises the controller receiving data signals of (or otherwise determining) an exhaust manifold pressure of the engine, and the controller differentiating between turbocharger degradation and degradation of the valve based at least in part on the exhaust manifold pressure. (The exhaust manifold pressure is a pressure of an exhaust manifold flowing exhaust to the first exhaust passage.)

In another embodiment, a method (e.g., method for controlling an engine) comprises generating, by a controller, first control signals based at least in part on a crankcase pressure. The first control signals are indicative of a condition of at least one of a first valve or a second valve disposed in a first exhaust passage downstream from a cylinder exhaust valve in an exhaust gas recirculation (EGR) system. The first control signals are configured to control at least one of the engine (e.g., a device associated with the engine) or another device (e.g., such as a display or other device for alerting an operator, or a memory unit for storing information about the condition). The EGR system selectively routes exhaust from a subset of engine cylinders to a second exhaust passage via the first valve and to an intake passage via the second valve. The controller generates the first control signals (i) based at least in part on an average of the crankcase pressure and (ii) when the average crankcase pressure is greater than a threshold crankcase pressure value and a donor cylinder exhaust manifold pressure is greater than a threshold manifold pressure.

In another embodiment, a method (e.g., method for controlling an engine) comprises a controller generating first control signals to control a first valve and a second valve to selectively route exhaust from a subset of engine cylinders to an exhaust passage via the first valve and to an intake passage via the second valve. The method further comprises the controller, during a first condition when an average crankcase pressure (of a crankcase of the engine) is greater than a threshold crankcase pressure while an exhaust pressure of the subset of engine cylinders is increasing, generating the first control signals and/or second control signals indicative of a condition of one or more of the first valve or second valve (for example, the condition may be valve degradation, leaking, sticking, or mis-positioning). The method further comprises the controller, during a second condition when the average crankcase pressure is greater than the threshold crankcase pressure and the exhaust pressure of the subset of engine cylinders is not increasing, generating the first control signals and/or third control signals indicating a condition (e.g., degradation) of an alternate engine system component (e.g., a turbocharger, a crankcase evacuation system, or one or more engine cylinders). The method may further comprise the controller receiving first data signals from a crankcase pressure sensor that is operably coupled with the crankcase to measure the crankcase pressure, the data signals including information about the crankcase pressure. Optionally, the first condition may occur during engine operation and the second condition may occur during engine operation.

In another embodiment, the method further comprises the controller processing the first data signals to determine a half-order frequency component of the crankcase pressure, and the controller differentiating between engine cylinder degradation, turbocharger or crankcase evacuation system degradation, and degradation of one or more of the first valve or the second valve based on the half-order frequency component of the crankcase pressure. For example, engine cylinder degradation may be indicated when the half-order frequency component of the crankcase pressure is greater than a threshold half-order pressure, and in such a case, the method may further comprise the controller shutting down the engine in response to the average crankcase pressure increasing above the threshold crankcase pressure.

As another example, turbocharger or crankcase evacuation system degradation may be indicated when the average crankcase pressure is greater than the threshold crankcase pressure, the half-order frequency component of the crankcase pressure is not greater than the threshold half-order pressure, and the exhaust pressure of the subset of engine cylinders is not over a threshold manifold pressure.

In another embodiment, the method further comprises, during the first condition, the controller confirming the condition of one or more of the first valve or the second valve based on the half order frequency component of a crankcase pressure not being greater than the threshold half-order pressure.

In another embodiment, the method further comprises the controller, during the first condition, not sending a signal to shut down or de-rate the engine.

In another embodiment, a system (e.g., an engine control system) comprises a controller having an input/output portion for (among other functions) sending control signals and receiving data signals. The controller is configured to generate first control signals based at least in part on a crankcase pressure. The first control signals are indicative of a condition of a valve disposed in a first exhaust passage downstream from a cylinder exhaust valve of the engine, and are configured to control at least one of the engine (e.g., a device associated with the engine) or another device (e.g., such as a display or other device for alerting an operator, or a memory unit for storing information about the condition). The controller may be further configured to receive first data signals from a crankcase pressure sensor that is operably coupled with the crankcase to measure the crankcase pressure, the data signals including information about the crankcase pressure. Alternatively or additionally, controller may be configured to receive second data signals (e.g., from other sensors or controllers/control units) indicative of one or more engine operating conditions, and to determine the crankcase pressure based on the second data signals that are received, and/or the controller is configured to determine the crankcase pressure based on the engine operating conditions that are ascertained some other way (e.g., the controller estimates the engine operating conditions based on a current operating mode of the engine, the engine configuration, etc.)

In another embodiment, a system (e.g., an engine control system) comprises a controller having an input/output portion for (among other functions) sending control signals and receiving data signals. The controller is configured to generate first control signals based at least in part on a crankcase pressure. The first control signals are indicative of a condition of at least one of a first valve or a second valve disposed in a first exhaust passage downstream from a cylinder exhaust valve in an exhaust gas recirculation (EGR) system of the engine. The first control signals are configured to control at least one of the engine (e.g., a device associated with the engine) or another device (e.g., such as a display or other device for alerting an operator, or a memory unit for storing information about the condition). The controller is configured to control the first valve and the second valve (e.g., by generating second control signals, or via the first control signals) based on engine operating conditions, to adjust positions of the first valve and the second valve EGR system for selectively routing exhaust from the engine to a second exhaust passage via the first valve and to an intake passage via the second valve.

In another embodiment, a system (e.g., an engine control system) comprises a controller having an input/output portion for (among other functions) sending control signals and receiving data signals. The controller is configured to generate first control signals based at least in part on a measured value of a crankcase pressure (of a crankcase of the engine) being over a threshold crankcase pressure while a measured pressure of an exhaust manifold of the engine is increasing. The first control signals are indicative of a condition of at least one of a first valve or a second valve disposed in a first exhaust passage downstream from a cylinder exhaust valve in an exhaust gas recirculation (EGR) system. The first control signals are configured to control at least one of the engine (e.g., a device associated with the engine, such as the first and/or second valves) or another device (e.g., such as a display for alerting an operator, or a memory unit for storing information about the condition, or an off-board system for storing information or generating an alert on a display or other device). The controller is configured to control the first valve and the second valve (e.g., by generating second control signals, or via the first control signals) based on engine operating conditions, to adjust positions of the first valve and the second valve EGR system for selectively routing exhaust from the engine to a second exhaust passage via the first valve and to an intake passage via the second valve. The first control signals may be indicative of mis-positioning of the first valve and/or the second valve, and/or degradation of the first valve and/or the second valve, and/or sticking of the first valve and/or the second valve, and/or leaking of the first valve and/or the second valve. The controller may be further configured to determine which of the first valve or the second valve is being indicated (e.g., indicated as being mis-positioned, degraded, stuck, and/or leaking) based at least in part on positions of the first valve and of the second valve as controlled by the controller (or another controller/control unit).

In another embodiment, a system (e.g., an engine control system) comprises a controller having an input/output portion for (among other functions) sending control signals and receiving data signals. The controller is configured to generate first control signals based at least in part on a crankcase pressure. The first control signals are indicative of a condition of a valve disposed in a first exhaust passage downstream from a cylinder exhaust valve, and are configured to control at least one of the engine (e.g., a device associated with the engine) or another device (e.g., such as a display or other device for alerting an operator, or a memory unit for storing information about the condition). The controller is further configured to: receive first data signals from a crankcase pressure sensor that is operably coupled with the crankcase to measure the crankcase pressure, the data signals including information about the crankcase pressure; determine a frequency content of the first data signals; differentiate between engine cylinder degradation and another engine component degradation based at least in part on the frequency content; and generate the first control signals and/or second control signals based on the differentiated engine cylinder degradation and another engine component degradation. For example, the controller may be configured to generate control signals indicative of engine cylinder degradation in response to a half-order frequency component of the first data signals being over a threshold half-order pressure; and to generate control signals indicative of degradation of another engine component when a steady-state value of the crankcase pressure is greater than a steady-state threshold value for the crankcase pressure, and the half-order frequency component of the first data signals is not over the threshold half-order pressure value.

In another embodiment of the system, the controller is additionally or alternatively configured to receive data signals of (or otherwise determine) an exhaust manifold pressure of the engine, and to differentiate between turbocharger degradation and degradation of the valve based at least in part on the exhaust manifold pressure. (The exhaust manifold pressure is a pressure of an exhaust manifold flowing exhaust to the first exhaust passage.)

In another embodiment, a system (e.g., engine control system) comprises a controller having an input/output portion for (among other functions) sending control signals and receiving data signals. The controller is configured to generate first control signals based at least in part on a crankcase pressure. The first control signals are indicative of a condition of at least one of a first valve or a second valve disposed in a first exhaust passage downstream from a cylinder exhaust valve in an exhaust gas recirculation (EGR) system of the engine. The first control signals are configured to control at least one of the engine (e.g., a device associated with the engine) or another device (e.g., such as a display or other device for alerting an operator, or a memory unit for storing information about the condition). The EGR system selectively routes exhaust from a subset of engine cylinders to a second exhaust passage via the first valve and to an intake passage via the second valve. The controller is configured to generate the first control signals (i) based at least in part on an average of the crankcase pressure and (ii) when the average crankcase pressure is greater than a threshold crankcase pressure value and a donor cylinder exhaust manifold pressure is greater than a threshold manifold pressure.

In another embodiment, a system (e.g., engine control system) comprises a controller having an input/output portion for (among other functions) sending control signals and receiving data signals. The controller is configured to generate first control signals to control a first valve and a second valve to selectively route exhaust from a subset of engine cylinders to an exhaust passage via the first valve and to an intake passage via the second valve. The controller is further configured, during a first condition when an average crankcase pressure (of a crankcase of the engine) is greater than a threshold crankcase pressure while an exhaust pressure of the subset of engine cylinders is increasing, to generate the first control signals and/or second control signals indicative of a condition of one or more of the first valve or second valve (for example, the condition may be valve degradation, leaking, sticking, or mis-positioning). The controller is further configured, during a second condition when the average crankcase pressure is greater than the threshold crankcase pressure and the exhaust pressure of the subset of engine cylinders is not increasing, to generate the first control signals and/or third control signals indicating a condition (e.g., degradation) of an alternate engine system component (e.g., a turbocharger, a crankcase evacuation system, or one or more engine cylinders). The controller may be further configured to receive first data signals from a crankcase pressure sensor that is operably coupled with the crankcase to measure the crankcase pressure, the data signals including information about the crankcase pressure. Optionally, the first condition may occur during engine operation and the second condition may occur during engine operation.

In another embodiment, the controller is configured to process the first data signals to determine a half-order frequency component of the crankcase pressure, and to differentiate between engine cylinder degradation, turbocharger or crankcase evacuation system degradation, and degradation of one or more of the first valve or the second valve based on the half-order frequency component of the crankcase pressure. For example, engine cylinder degradation may be indicated when the half-order frequency component of the crankcase pressure is greater than a threshold half-order pressure, and in such a case, the controller may be further configured to shut down the engine in response to the average crankcase pressure increasing above the threshold crankcase pressure.

In another embodiment, the controller is configured, during the first condition, to confirm the condition of one or more of the first valve or the second valve based on the half order frequency component of a crankcase pressure not being greater than the threshold half-order pressure.

In another embodiment, the controller is configured, during the first condition, to not send a signal to shut down or de-rate the engine.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
a crankcase pressure sensor operable to measure a crankcase pressure of a crankcase in an engine;
an exhaust gas recirculation (EGR) system including:
a first valve configured to route exhaust to an exhaust passage of the engine; and
a second valve configured to route exhaust to an intake passage of the engine;
an exhaust manifold pressure sensor positioned in an exhaust manifold, upstream of the first valve and the second valve, the exhaust manifold pressure sensor configured to measure an exhaust pressure; and
a controller configured to:
indicate an operating condition of one or more of the first valve or the second valve based at least in part on a signal received from the crankcase pressure sensor; and
indicate the operating condition of the one or more of the first valve or the second valve when a steady-state value of the signal received from the crankcase pressure sensor is over a threshold crankcase pressure signal value while the exhaust pressure is over a threshold exhaust pressure.

2. The system of claim 1, wherein the operating condition of the one or more of the first valve or the second valve includes one or more of degradation, leaking, sticking, or mis-positioning of one or more of the first valve and the second valve.

3. The system of claim 1, wherein the controller is further configured to confirm the operating condition of the one or more of the first valve or the second valve when a half-order frequency component of the signal from the crankcase pressure sensor is less than a threshold half-order frequency.

4. A system, comprising:
a crankcase pressure sensor operable to measure a crankcase pressure of a crankcase in an engine;
an exhaust gas recirculation (EGR) system including:
a first valve configured to route exhaust to an exhaust passage of the engine; and
a second valve configured to route exhaust to an intake passage of the engine;
an exhaust manifold pressure sensor positioned in a first exhaust manifold, upstream of the first valve and the second valve, and configured to measure an exhaust pressure; and
a controller configured to:
indicate an operating condition of one or more of the first valve or the second valve in response to a signal received from the crankcase pressure sensor; and
diagnose which of the first valve or the second valve is being indicated based on commanded positions of the first valve and the second valve and the exhaust pressure.

5. The system of claim 4, wherein the controller is further configured to indicate the operating condition of one or more of the first valve or the second valve in response to the signal received from the crankcase pressure sensor being above a threshold crankcase pressure signal value while the exhaust pressure is increasing.

6. The system of claim 5, wherein the controller is further configured to indicate mis-positioning of the second valve in response to the commanded position of the first valve being a closed position and the second valve being an open position and the exhaust pressure increasing.

7. The system of claim 5, wherein the controller is further configured to indicate mis-positioning of the first valve in response to the commanded position of the first valve being an open position and the second valve being a closed position and the exhaust pressure increasing.

8. The system of claim 5, wherein the controller is further configured to indicate an operating condition of an alternate engine system component and not the first and second valves in response to the signal received from the crankcase pressure sensor being greater than the threshold crankcase pressure signal value while the exhaust pressure is not increasing.

9. The system of claim 4, wherein the first exhaust manifold is coupled to a plurality of donor cylinders and configured to route exhaust gas to the EGR system and further comprising a second exhaust manifold coupled to a plurality of non-donor cylinders and configured to route exhaust to the exhaust passage.

10. The system of claim 4, wherein the operating condition of the one or more of the first valve or the second valve includes one or more of degradation, leaking, sticking, or mis-positioning of one or more of the first valve or the second valve.

* * * * *